(12) United States Patent
Miyachi et al.

(10) Patent No.: US 8,124,219 B2
(45) Date of Patent: Feb. 28, 2012

(54) RESIN PANEL AND MANUFACTURING METHOD THEREFOR

(75) Inventors: Toshiki Miyachi, Hiroshima (JP); Shinji Gasami, Hiroshima (JP)

(73) Assignee: Daikyonishikawa Corporation (JP)

( * ) Notice: Subject to any disclaimer, the term of this patent is extended or adjusted under 35 U.S.C. 154(b) by 724 days.

(21) Appl. No.: 11/519,054

(22) Filed: Sep. 12, 2006

(65) Prior Publication Data

US 2007/0095015 A1    May 3, 2007

(30) Foreign Application Priority Data

Sep. 27, 2005    (JP) ................. 2005-279212

(51) Int. Cl.
- B32B 3/28     (2006.01)
- B32B 3/30     (2006.01)
- B32B 1/08     (2006.01)
- B32B 3/00     (2006.01)
- B32B 37/00    (2006.01)
- B29D 22/00    (2006.01)
- B29D 23/00    (2006.01)
- B65D 39/00    (2006.01)
- B60N 3/00     (2006.01)
- B62D 29/04    (2006.01)
- B62D 33/04    (2006.01)
- B29C 67/00    (2006.01)
- B29C 65/00    (2006.01)
- E04C 1/00     (2006.01)

(52) U.S. Cl. ........ 428/188; 428/36.5; 428/71; 52/309.7; 52/309.8; 52/309.9; 52/309.11; 264/45.5; 264/46.4; 264/46.5; 264/46.6

(58) Field of Classification Search ............ 428/71, 428/188, 36.5; 52/309.7, 309.9, 794.1, 309.8, 52/309.11, 309.2; 296/24.44, 37.16, 181.2, 296/181.3, 187.02, 191; 264/45.5, 46.4–46.6

See application file for complete search history.

(56) References Cited

U.S. PATENT DOCUMENTS

| | | | | |
|---|---|---|---|---|
| 3,043,730 A | * | 7/1962 | Adie | 428/159 |
| 3,222,697 A | * | 12/1965 | Scheermesser | 428/160 |
| 3,497,990 A | * | 3/1970 | Jeffries | 43/131 |
| 3,562,985 A | * | 2/1971 | Nicosia | 52/241 |
| 3,961,118 A | * | 6/1976 | Michaelis | 428/151 |
| 4,038,798 A | * | 8/1977 | Sachs | 52/309.7 |

(Continued)

FOREIGN PATENT DOCUMENTS

DE    27 27 458 A1    1/1979

(Continued)

*Primary Examiner* — Callie Shosho
*Assistant Examiner* — Nicholas Kokkinos
(74) *Attorney, Agent, or Firm* — Studebaker & Brackett PC; Donald R. Studebaker

(57) ABSTRACT

A resin panel for an automobile includes a skin layer formed on sides of a package tray along the direction of the thickness of the package tray and both surfaces of the package tray substantially orthogonal to the sides. An expanded layer is formed in an inner part of the package tray surrounded by the skin layer having voids by enlarging the volume of the cavity of a mold assembly during molding of the package tray to expand a thermoplastic resin in the cavity. Hollow ribs are formed of solid layers in the expanded layer to extend along the surfaces, each have a hollow formed inside over the entire length so that ends of the hollow rib continue out to the skin layer at the opposed sides of the panel. Openings in communication with the hollow rib are formed through the skin layer at the opposed sides, respectively.

12 Claims, 32 Drawing Sheets

U.S. PATENT DOCUMENTS

| | | | | |
|---|---|---|---|---|
| 4,234,634 | A | * | 11/1980 | Longinotti ...................... 428/58 |
| 4,306,395 | A | * | 12/1981 | Carpenter ..................... 52/223.6 |
| 5,172,954 | A | * | 12/1992 | Yamazaki et al. .......... 296/180.1 |
| 5,245,770 | A | * | 9/1993 | Ko et al. ......................... 37/443 |
| 5,254,228 | A | * | 10/1993 | Westhof et al. ............... 205/734 |
| D358,125 | S | * | 5/1995 | Jackson ....................... D12/425 |
| 5,945,048 | A | * | 8/1999 | Ensinger ...................... 264/46.1 |
| 5,997,077 | A | * | 12/1999 | Siebels et al. ............ 296/187.12 |
| 6,412,243 | B1 | * | 7/2002 | Sutelan ........................ 52/309.7 |
| 6,638,457 | B2 | * | 10/2003 | Inagaki .......................... 264/113 |
| 6,783,865 | B2 | * | 8/2004 | Sanduja et al. ................ 428/523 |
| 7,140,676 | B2 | * | 11/2006 | Schonebeck ............. 296/216.09 |
| 2006/0055212 | A1 | * | 3/2006 | Schonebeck ............. 296/216.09 |

FOREIGN PATENT DOCUMENTS

| | | |
|---|---|---|
| DE | 100 14 156 A1 | 10/2001 |
| JP | 2538513 B | 4/1997 |

* cited by examiner

RESIN PANEL AND MANUFACTURING METHOD THEREFOR

CROSS-REFERENCES TO RELATED APPLICATION

This application claims priority under 35 USC 119 to Japanese Patent Application No. 2005-279212 filed on Sep. 27, 2005, the entire contents of which are incorporated herein by reference.

BACKGROUND OF THE INVENTION (1) Field of the Invention

This invention relates to improvements in a resin panel in which a skin layer is formed on its surface and an expanded layer having a multiplicity of voids is formed inside it and improvements in a method for manufacturing the resin panel.

(2) Description of the Related Art

Registered Japanese Utility-Model Publication No. 2538513 (hereinafter, referred to as Patent Document 1) discloses a technique of forming a resin panel having hollows inside it by blow molding and thereby saving its weight. In the case of this resin panel, the opposed panel surfaces are deformed to form cylindrical support parts therebetween by pressing a parison from both sides with halves of a mold assembly in blow molding and metal pipes are pressed in the support parts, respectively, to provide rigidity.

In the resin panel disclosed in Patent Document 1, however, the contours of the support parts for supporting the metal pipes pressed in them are exposed as recesses at the external surface of the resin panel, which disfigures the appearance of the resin panel. Further, the metal pipes pressed in the support parts increases the total weight of the resin panel correspondingly, which hinders weight saving. Furthermore, since the panel inside is formed not of an expanded layer having a multiplicity of voids but of hollows, deformations such as warpages occur on the surfaces, which further deteriorates the resin panel appearance.

SUMMARY OF THE INVENTION

The present invention has been made with the foregoing in mind and, therefore, its object is to provide a resin panel ensuring high rigidity while providing excellent appearance and reduced weight.

To attain the above object, the present invention is characterized by employing expansion molding instead of blow molding.

Specifically, the present invention is directed to a resin panel including: a skin layer formed of a solid layer on sides thereof along a direction of the panel thickness and both surfaces thereof substantially orthogonal to the sides; and an expanded layer formed in an inner part thereof surrounded by the skin layer to have a multiplicity of voids by enlarging the volume of the cavity of a mold assembly during molding of the resin panel to expand a thermoplastic resin in the cavity and also directed to a method for manufacturing the resin panel. In the present invention, the following solutions are taken.

First to eighth solutions of the invention are directed to the resin panel. The first solution is characterized in that a hollow rib is formed of a solid layer in the expanded layer to extend along the panel surfaces and has a hollow formed inside over the entire length of the hollow rib, at least one end of the hollow rib continuing out to the skin layer at adjacent one of the panel sides, and an opening in communication with the hollow of the hollow rib is formed through the skin layer at said adjacent one of the panel sides.

The second solution relates to the first solution and is characterized in that the hollow rib exists toward the panel surface located opposite the direction of expansion of the thermoplastic resin.

The third solution relates to the first solution and is characterized in that the hollow rib exists substantially in the middle of the thickness of the resin panel.

The fourth solution relates to the first solution and is characterized in that the hollow rib continues out to the skin layer at the panel surface located opposite the direction of expansion of the thermoplastic resin.

The fifth solution relates to the fourth solution and is characterized in that the hollow rib has the shape of a plate and continues out to the skin layer at the panel surface located in front of the direction of expansion of the thermoplastic resin.

The sixth solution relates to the fifth solution and is characterized in that the hollow rib projects from the skin layer at the panel surface located in front of the direction of expansion of the thermoplastic resin to form a ridge.

The seventh solution relates to the fourth or fifth solution and is characterized in that at least one of both the panel surfaces has a through hole formed as a spot by a molding retention part holding a core pin for forming the hollow rib during molding of the resin panel, the through hole communicating with the hollow of the hollow rib.

The eighth solution relates to the first solution and is characterized in that the hollow rib comprises a plurality of hollow ribs, some of the plurality of hollow ribs exists toward and continue out to the panel surface located in front of the direction of expansion of the thermoplastic resin while the others exist toward and continue out to the panel surface located opposite the direction of expansion of the thermoplastic resin, and the hollow ribs toward one of the opposed panel surfaces and the hollow ribs toward the other panel surface are alternated along the panel surfaces.

Ninth to twelfth solutions of the invention are directed to the method for manufacturing the resin panel. The ninth solution is a method for manufacturing the resin panel of the first solution and characterized by comprising: injecting a thermoplastic resin into the cavity to fill the cavity in a state that the mold assembly is closed and a core pin for forming the hollow rib is set in the cavity and enlarging the volume of the cavity in the course of solidification of the thermoplastic resin in the cavity to expand the thermoplastic resin; and then retracting the core pin from within the cavity.

The tenth solution is a method for manufacturing the resin panel of the fifth solution and characterized by comprising: injecting a thermoplastic resin into the cavity to fill the cavity in a state that the mold assembly is closed and a core pin slightly smaller in width than the width of the cavity when enlarged in volume is set in the cavity and enlarging the volume of the cavity in the course of solidification of the thermoplastic resin in the cavity to expand the thermoplastic resin; and then retracting the core pin from within the cavity.

The eleventh solution is a method for manufacturing the resin panel of the seventh solution and characterized by comprising: injecting a thermoplastic resin into the cavity to fill the cavity in a state that the mold assembly is closed and a core pin for forming the hollow rib is set in the cavity and held by the molding retention part of the mold assembly projecting into the cavity and enlarging the volume of the cavity in the course of solidification of the thermoplastic resin in the cavity to expand the thermoplastic resin; and then retracting the core pin from within the cavity, thereby obtaining a resin panel in which at least one of both the panel surfaces has a through hole formed as a spot by the molding retention part to communicate with the hollow of the hollow rib.

The twelfth solution is a method for manufacturing the resin panel of the eighth solution and characterized by comprising: closing the mold assembly and setting in the cavity a plurality of core pins for forming the plurality of hollow ribs so that some of the plurality of core pins are disposed toward one side of the cavity toward which the thermoplastic resin expands while the others are disposed toward the other side of the cavity away from which the thermoplastic resin expands and the core pins toward the one side of the cavity and the core pins toward the other side of the cavity are alternated along the panel surfaces; then injecting a thermoplastic resin into the cavity to fill the cavity and enlarging the volume of the cavity in the course of solidification of the thermoplastic resin in the cavity to expand the thermoplastic resin; and then retracting the core pins from within the cavity.

According to the first solution of the invention, since the inner part of the resin panel surrounded by the skin layer is formed into an expanded layer having a multiplicity of voids, this reduces the weight of the resin panel. Further, since the expanded layer exists in the resin panel and includes a hollow rib so that at least one end thereof continues out to the skin layer at adjacent one of the panel sides, the resin panel is increased in rigidity as compared to the resin panel in Patent Document 1 whose inner part is formed of hollows. Furthermore, since the hollow rib is in the expanded layer where it has no effect on the external surface of the resin panel and the expanded layer has a multiplicity of voids, this improves the appearance of the resin panel surfaces.

According to the second solution of the invention, the panel surface opposite the direction of expansion of the thermoplastic resin can be increased in rigidity.

According to the third solution of the invention, since the hollow rib is located substantially in the middle of the panel thickness, the rigidity of the entire resin panel can be uniformed in a balanced manner.

According to the fourth solution of the invention, the panel surface opposite the direction of expansion of the thermoplastic resin can be further increased in rigidity.

According to the fifth solution of the invention, since the opposed panel surfaces are bridged (joined) by the hollow rib, the rigidity of the entire resin panel can be further enhanced. In particular, both the panel surfaces bridged (joined) by the hollow rib can be increased in rigidity.

According to the sixth solution of the invention, since the ridge projecting from the skin layer at one panel surface is formed, this avoids deterioration of the appearance of a portion of the surface under which the hollow rib is formed.

According to the seventh solution of the invention, the hollow rib can be formed in a proper position without displacement, which ensures the proper rigidity of the resin panel.

According to the eighth solution of the invention, since a plurality of hollow ribs are formed toward each of the opposed panel surfaces to continue out to the panel surfaces, the rigidity of the entire resin panel can be enhanced.

According to the ninth solution of the invention, if only the cavity volume is enlarged and the core pin is then retracted from within the cavity, a resin panel according to the first solution ensuring high rigidity while having excellent appearance and light weight can be easily produced with a simple mold assembly.

According to the tenth solution of the invention, a resin panel according to the fifth solution can be easily produced with a simple mold assembly.

According to the eleventh solution of the invention, since the core pin is held by the molding retention part during molding, a resin panel according to the seventh solution can be easily produced in which the hollow rib is formed in a proper position without displacement.

According to the twelfth solution of the invention, a resin panel according to the eighth solution, in which a plurality of hollow ribs are formed toward each of the opposed panel surfaces to continue out to the panel surfaces, can be easily produced with a simple mold assembly.

DETAILED DESCRIPTION OF THE INVENTION

Hereinafter, embodiments of the present invention will be described with reference to the drawings.

Embodiment 1

Figure 5:
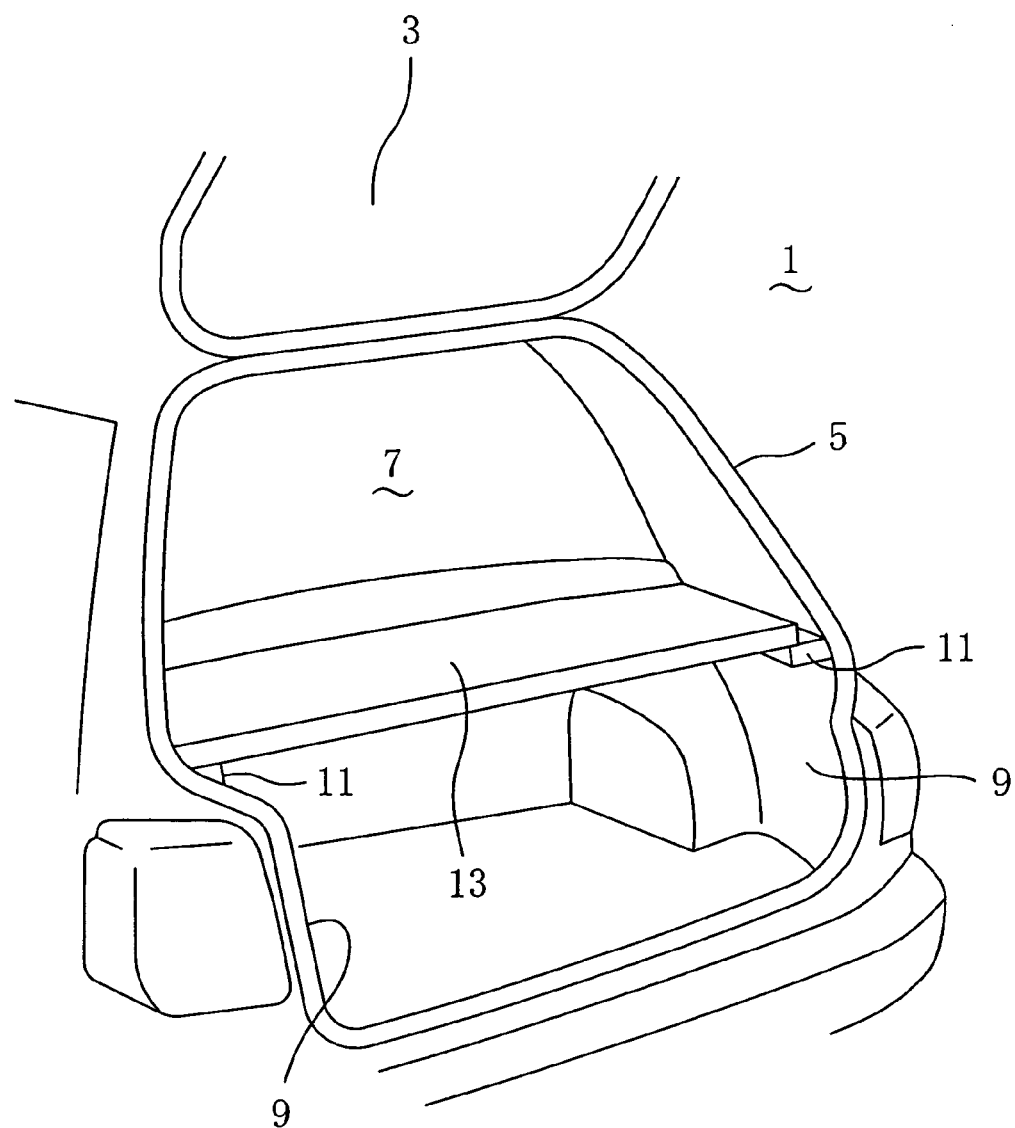
FIG. 5 is a perspective view of a trunk in the rear part of a hatchback car when the present invention is applied to a package tray for the car.

FIG. 5 shows a state that a back door 3 of a hatchback car 1 is opened upward to leave a trunk 7 in the rear part of a car body 5 open. Trunk-side trims 9 and 9 are disposed on both sides of the trunk 7 in the car width direction. A substantially rectangular package tray 13 is detachably placed as a resin panel according to the present invention on supports 11 and 11 formed on the trunk-side trims 9 and 9, respectively, to partition the trunk 7 into upper and lower spaces.

Figure 1:
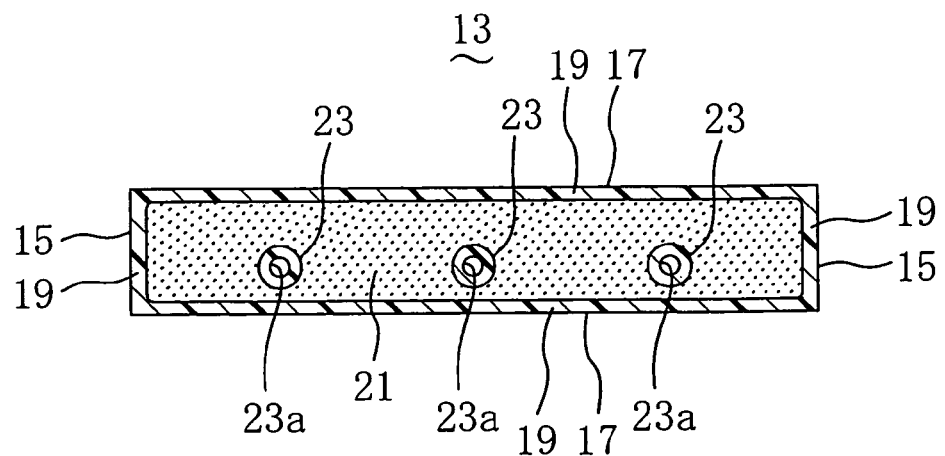
FIG. 1 is a cross-sectional view taken along the line I-I in FIG. 2.
Figure 2:
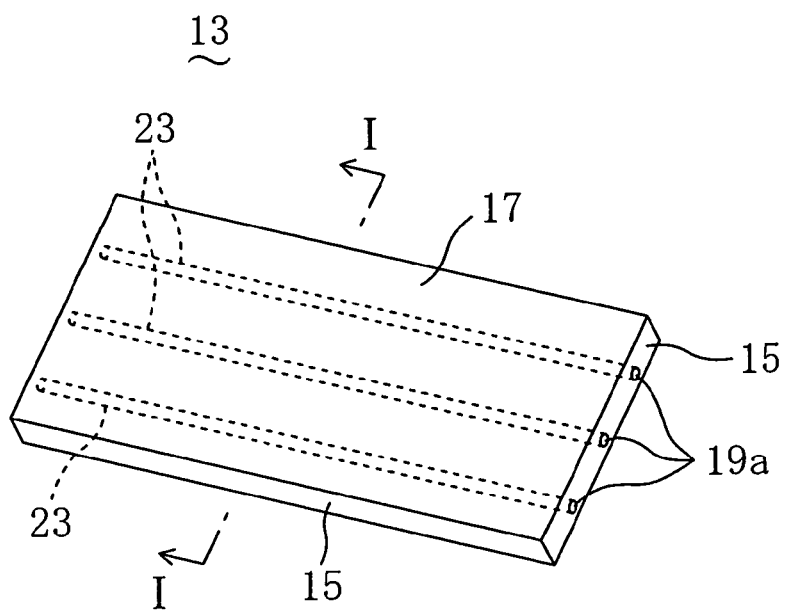
FIG. 2 is a perspective view of a package tray according to Embodiment 1 of the invention.

As shown in FIGS. 1 and 2, the package tray 13 according to Embodiment 1 of the invention includes a skin layer 19 formed of a solid layer on its four sides 15 along the thickness direction and both surfaces 17 substantially orthogonal to the four sides 15. The package tray 13 also includes an expanded layer 21 formed in its inner part surrounded by the skin layer 19 to have a multiplicity of voids (not shown) by enlarging the volume of the cavity of a mold assembly during molding to expand a thermoplastic resin R (see FIG. 3) fed in the cavity. Though not shown in the figures, fibers such as glass fibers are mixed into the thermoplastic resin R.

In the expanded layer 21, three round tubular hollow ribs 23 formed of solid layers are formed so that both ends of each hollow rib 23 are integral and continuous with adjacent portions of the skin layer 19 located at two opposed sides 15 of the package tray 13. Each hollow rib 23 extends along the opposed surfaces 17 and has a hollow 23a formed inside over its entire length. In the portions of the skin layer 19 located at the two opposed sides 15, openings 19a passing through the skin layer 19 are formed to communicate with the hollows 23a of the hollow ribs 23. Though also described later in relation to a manufacturing method for the package tray 13, the hollow ribs 23 exist toward the surface 17 located opposite the direction of expansion of the thermoplastic resin R (downward of the middle of the panel thickness in FIGS. 1 and 2).

Since the expanded layer 21 having a multiplicity of voids is thus formed in the inner part of the package tray 13 surrounded by the skin layer 19, this provides weight reduction of the package tray 13. Further, since the expanded layer 21 includes hollow ribs 23 both ends of which continue out to the skin layer 19 at the two opposed sides 15 of the package tray 13, the package tray 13 can be increased in rigidity as compared to the resin panel in Patent Document 1 whose inner part is formed of hollows. Furthermore, since the expanded layer 21 exists in the package tray 13, this prevents the occurrence of deformations such as warpages on the surfaces of the package tray 13 and thereby gives the package tray 13 an excellent appearance. Furthermore, since the hollow ribs 23 are in the expanded layer 21 where they have no effect on the external surface of the package tray 13, this prevents the appearance of the package tray 13 from being deteriorated.

Next, a description is given of a manufacturing method for the package tray 13 as described above.

Figure 3A:
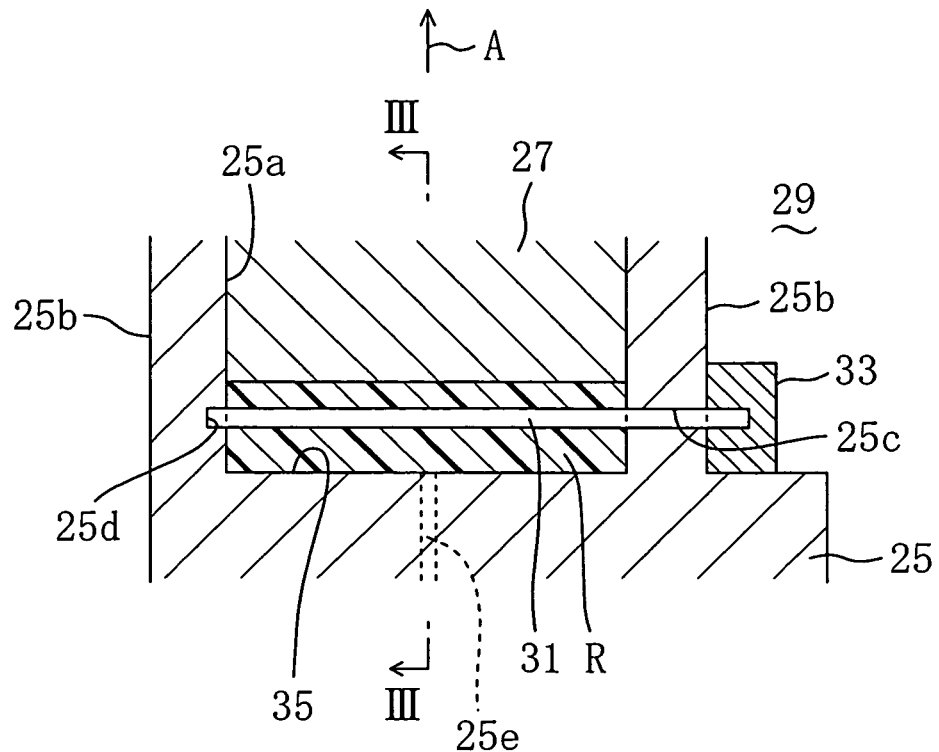
FIG. 3A is a cross-sectional view of a mold assembly in one step of a manufacturing method for the package tray according to Embodiment 1 in which a thermoplastic resin is injected in the cavity of the mold assembly to fill it and FIG. 3B is a cross-sectional view taken along the line III-III in FIG. 3A.
Figure 3B:
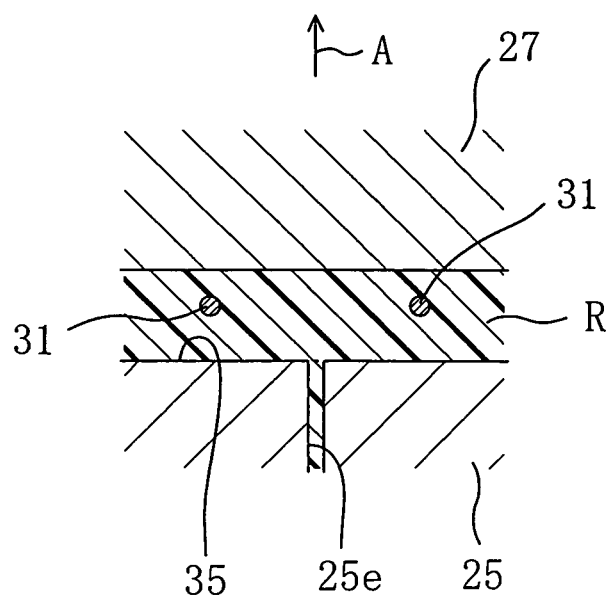

In manufacturing the package tray 13, as shown in FIGS. 3 and 4, a mold assembly 29 is prepared that includes a stationary mold 25 having a concavity 25a and a movable mold 27 accommodated in the concavity 25a of the stationary mold 25 for advance and retraction. In one of two opposed side walls 25b defining the concavity 25a of the stationary mold 25, three through holes 25c (only one shown in the figures) are formed towards the bottom of the concavity 25a at spaced intervals to extend in the car front-to-rear direction (the right-to-left direction in FIG. 1) and along the surfaces 17. In the other of the opposed side walls 25b, three engaging holes 25d (only one shown in the figures) are formed at spaced intervals oppositely to the through holes 25c. Retractably inserted in the three through holes 25c are three core pins 31 for forming hollow ribs, respectively, each formed of a solid bar round in cross section and engageable at the distal end with the associated engaging hole 25d. The proximal ends of the three core pins 31 are joined through a connecting member 33 to an unshown hydraulic cylinder and configured to enter into and retract from the cavity 35 formed between the stationary mold 25 and the movable mold 27 in their closed position by extension and retraction of the hydraulic cylinder. In Embodiment 1, the distance between the core pins 31 and bottom of the concavity 25a of the stationary mold 25 is selected so that a small part of the thickness of the expanded layer 21 finally produced can be formed therebetween. The stationary mold 25 is formed with a resin passage 25e through which the thermoplastic resin R can be injected from an unshown injector into the cavity 35. For the sake of convenience, in FIGS. 3 and 4, the distance between the opposed side walls 25b of the stationary mold 25 is expressed to be shorter than the length of the package tray 13 expressed in FIG. 2. The same is applied to the below described Embodiments.

<Manufacturing Method>

First, as shown in FIG. 3, the movable mold 27 is advanced down to close the mold assembly 29. Before or after the mold closing, the three core pins 31 are set into the cavity 35 by the extension of the hydraulic cylinder (not shown) until their distal ends are engaged into the engaging holes 25d of the side wall 25b.

Subsequently, a thermoplastic resin R containing fibers such as glass fibers (for example, fiber-contained polypropylene resin) is injected from the injector (not shown) through the resin passage 25e into the cavity 35 to fill the cavity 35.

Thereafter, in the course of solidification of the thermoplastic resin R in the cavity 35 of the mold assembly 29, specifically, at the time when a skin layer 19 has been formed in a portion of the thermoplastic resin R located in the vicinity of the molding surfaces of the mold assembly 29 in the cavity 35, as shown in FIG. 4, the movable mold 27 is retracted in the mold opening direction A to enlarge the cavity volume, thereby expanding the thermoplastic resin R.

Thus, a portion of the thermoplastic resin R in contact with the molding surfaces of the mold assembly 29 is early cooled owing to the mold temperature so that a skin layer 19 formed of a solid layer having high resin density is formed on the panel sides 15 and surfaces 17. In addition, hollow ribs 23 formed of solid layers having high resin density are formed likewise in portions of the thermoplastic resin R in contact with the outer surfaces of the core pins 31. On the other hand, the inside of the thermoplastic resin R is insusceptible to the mold temperature and still in a gel form having high viscosity. Therefore, when the cavity volume is enlarged, fibers (not shown) having been compressed by the mold assembly 29 up to that time are relieved of the compression and elastically restore. This elastic restoring force (spring-back action), i.e., the expansion pressure, causes the thermoplastic resin R to expand, thereby providing a package tray 13 in which an expanded layer 21 having a multiplicity of voids and lower resin density than the skin layer 19 is formed in the inner part thereof surrounded by the skin layer 19. In the expanded layer 21 of the package tray 13 thus molded, three hollow ribs 23 of solid layers extending along the surfaces 17 and each having a hollow 23a formed inside are formed so that both ends thereof integrally continue out to the skin layer 19 at the two opposed panel sides 15. The portions of the skin layer 19 located at the two opposed panel sides 15 are formed with openings 19a passing through them and communicating with the hollows 23a of the hollow ribs 23, respectively. The hollow ribs 23 are off the middle of the thickness of the package tray 13 and exist toward the surface 17 located opposite the direction of expansion of the thermoplastic resin R (downward of the middle of the panel thickness in FIGS. 1, 4A and 4B).

Figure 4A:
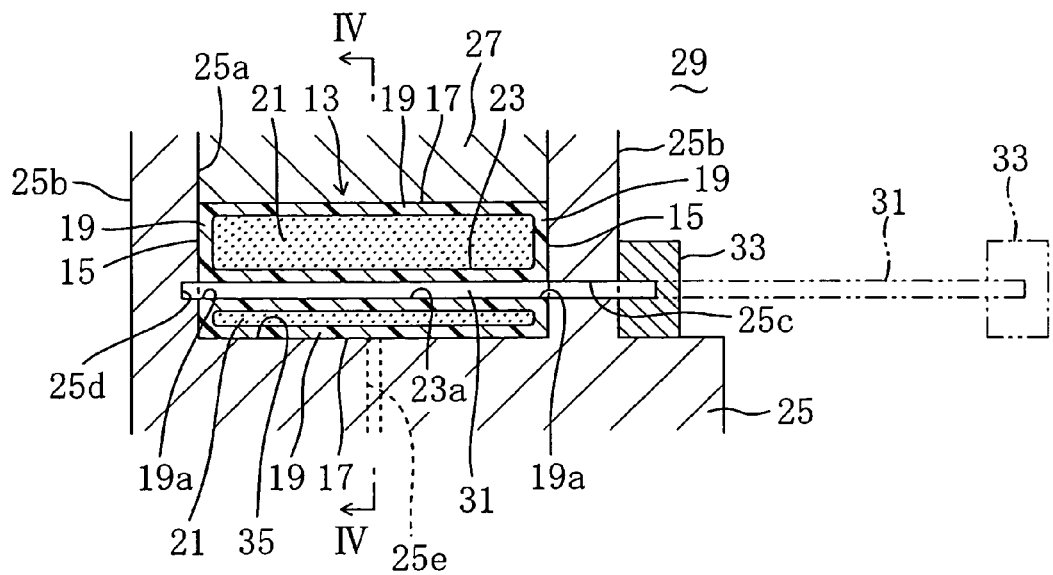
FIG. 4A is a cross-sectional view of the mold assembly in another step of the manufacturing method in which a movable mold of the mold assembly is retracted and a package tray is molded in the cavity and FIG. 4B is a cross-sectional view taken along the line IV-IV in FIG. 4A.
Figure 4B:
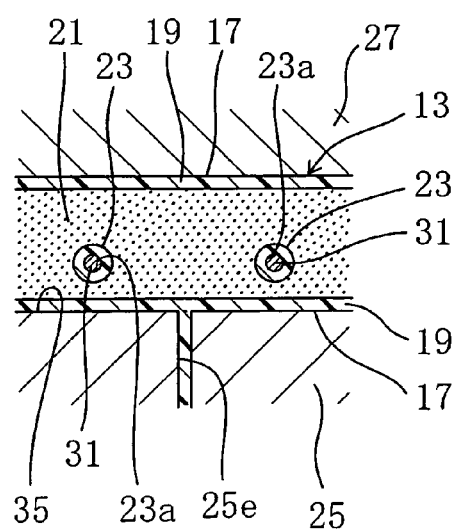

Then, at the stage where the package tray 13 has sufficiently solidified in the cavity 35 of the mold assembly 29, as shown in the imaginary lines in FIG. 4A, the core pins 31 are retracted from within the cavity 35 by the retraction of the hydraulic cylinder to extract them from the hollows 23a of the hollow ribs 23. Subsequently, the movable mold 27 is further retracted and the package tray 13 is removed from the mold assembly 29.

As described so far, if only the movable mold 27 is retracted to enlarge the cavity volume and the core pins 31 are then extracted from within the cavity 35, a package tray 13 ensuring high rigidity while having an excellent appearance and a light weight can be easily produced.

Embodiment 2

Figure 6:
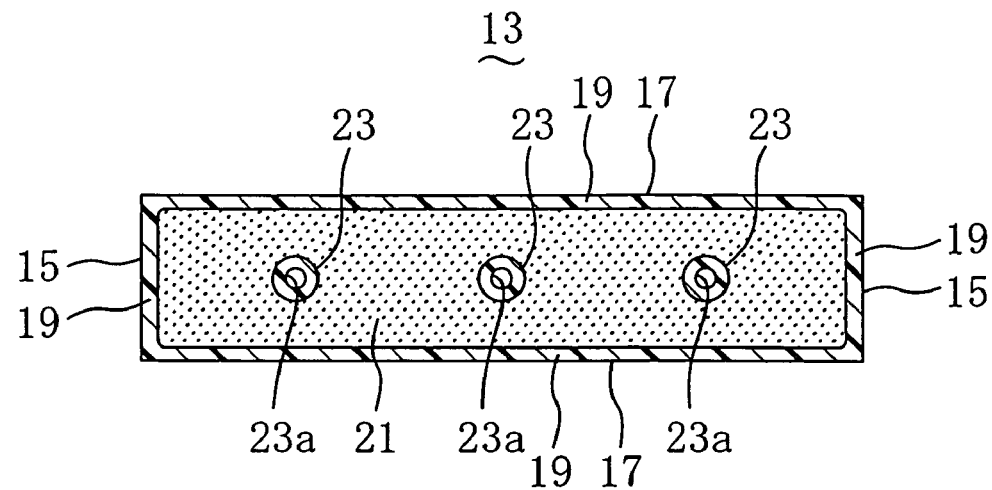
FIG. 6 is a cross-sectional view taken along the line VI-VI in FIG. 7.
Figure 7:
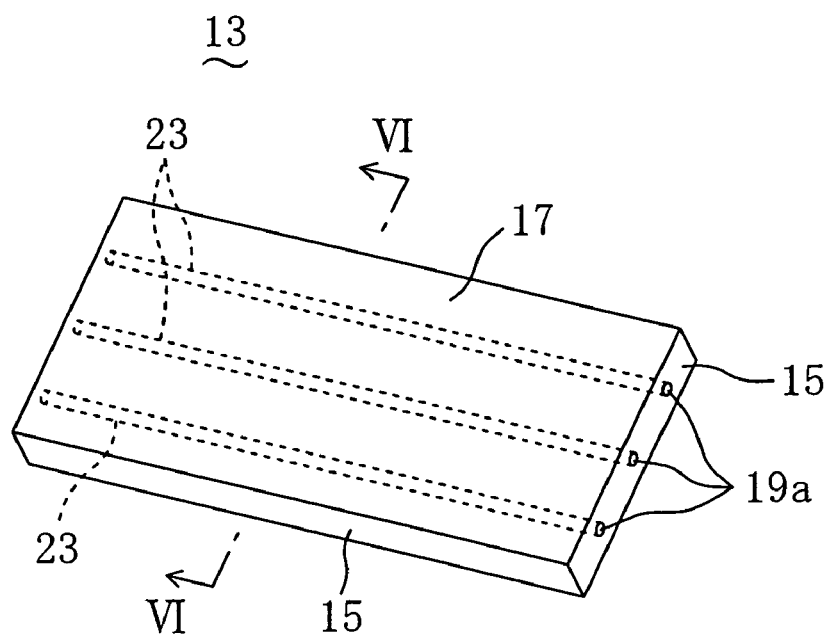
FIG. 7 is a perspective view of a package tray according to Embodiment 2 of the invention.
Figure 8A:
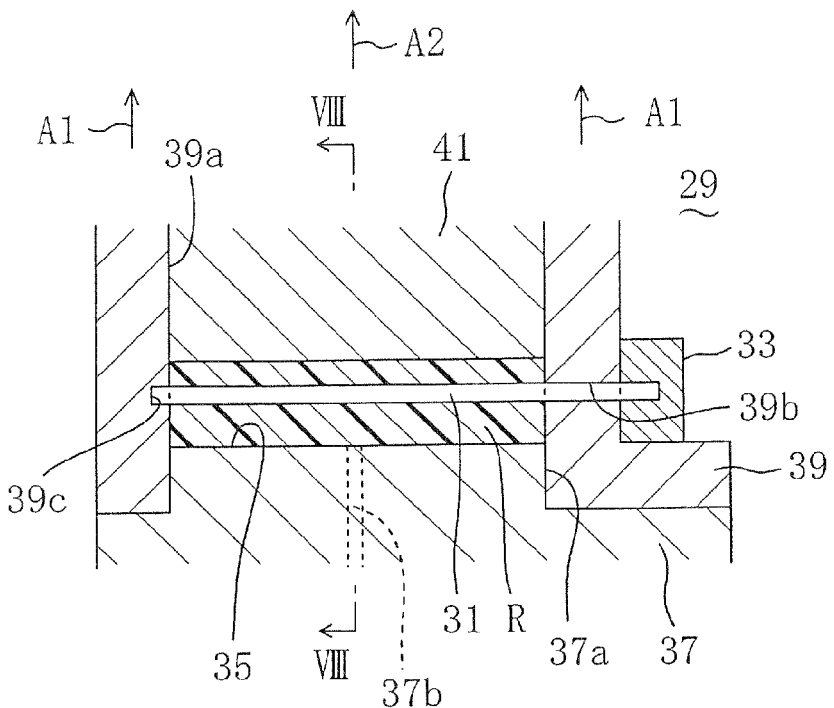
FIG. 8A is a cross-sectional view of a mold assembly in one step of a manufacturing method for the package tray according to Embodiment 2 in which a thermoplastic resin is injected in the cavity of the mold assembly to fill it and FIG. 8B is a cross-sectional view taken along the line VIII-VIII in FIG. 8A.
Figure 8B:
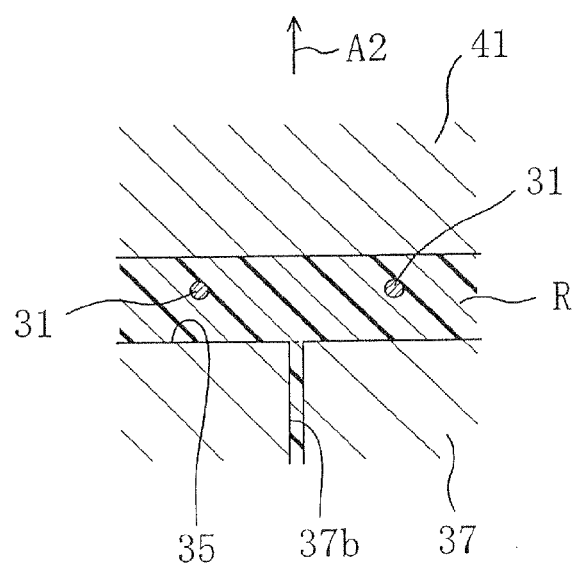
Figure 9A:
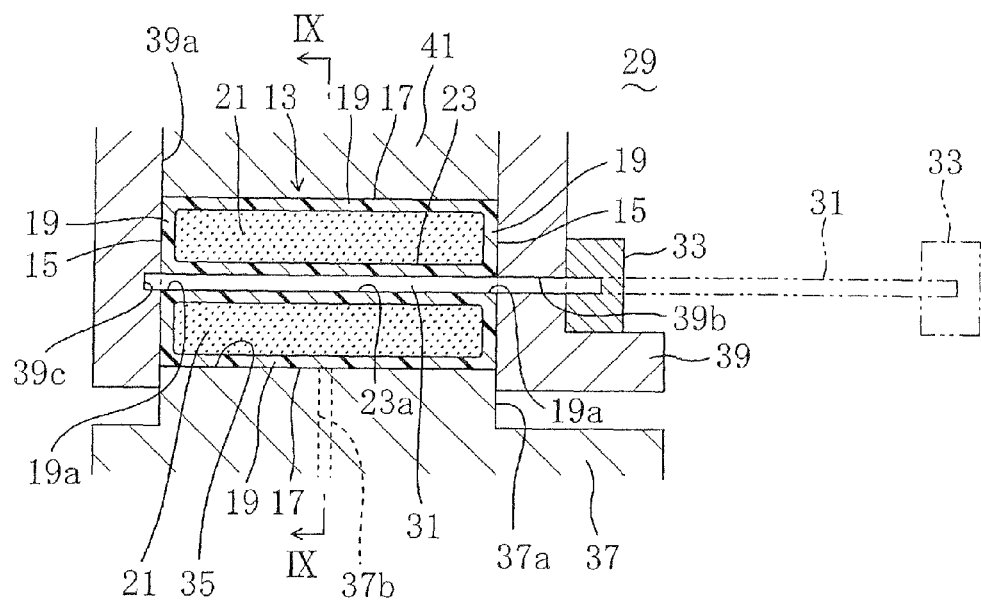
FIG. 9A is a cross-sectional view of the mold assembly in another step of the manufacturing method for the package tray according to Embodiment 2 in which first and second movable molds of the mold assembly are retracted and a package tray is molded in the cavity and FIG. 9B is a cross-sectional view taken along the line IX-IX in FIG. 9A.
Figure 9B:
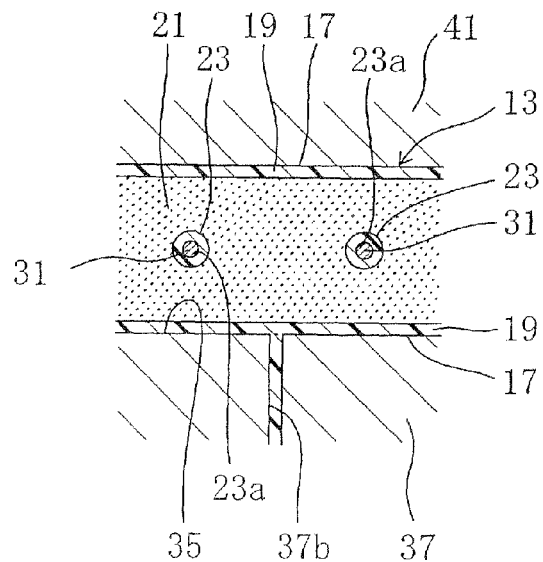

FIGS. 6 and 7 show a rectangular package tray 13 according to Embodiment 2 and FIGS. 8 and 9 show a mold assembly in different manufacturing steps for the package tray 13. Embodiment 2 is different from Embodiment 1 only in that the three hollow ribs 23 exist substantially in the middle of the panel thickness. Therefore, the same components are indicated by the same reference numerals and a description is not given of the structure of the package tray 13.

Further, in the mold assembly 29, the stationary mold 25 used in Embodiment 1 is separated in upper and lower parts, the lower part serves as a stationary mold 37 and the upper part serves as a first movable mold 39. The movable mold 37 used in Embodiment 1 is referred to as a second movable mold 41. The upper end of the stationary mold 37 is formed into a raised part 37a. The first movable mold 39 is formed with an insertion hole 39a in which the second movable mold 41 is inserted for advance and retraction. The raised part 37a of the stationary mold 37 is movably inserted in the lower end of the insertion hole 39a of the first movable mold 39. Reference numeral 37b denotes a resin passage, reference numeral 39b denotes a through hole into which a core pin 31 can be inserted and reference numeral 39c denotes an engaging hole in which the distal end of the core pin 31 can be engaged.

The relative position of the core pins 31 to the cavity 35 in Embodiment 2 is the same as in Embodiment 1 in respect of the mold closing position before expansion molding (see FIGS. 3 and 8). However, where expansion molding takes place, the first movable mold 39 and the second movable mold 41 are both retracted in the directions A1 and A2 of the mold opening (see FIG. 9) to enlarge the cavity volume, thereby expanding the thermoplastic resin R. In the retraction, the second movable mold 41 is retracted farther than the first movable mold 39 so that the core pins 31 can be located substantially in the middle of the height of the enlarged cavity volume. The timings of actuation of the first and second movable molds 39 and 41 may coincide or one may precede the other. The other manufacturing steps are the same as in Embodiment 1 and, therefore, a description thereof is not given.

The package tray 13 thus produced has three hollow ribs 23 located substantially in the middle of the panel thickness. Therefore, the portions of the expanded layer 21 on both sides of the hollow ribs 23 in the panel thickness direction have substantially the same thickness, which uniforms the rigidity of the entire package tray 13 in a balanced manner. The other effects are the same as in Embodiment 1.

Embodiment 3

Figure 10:
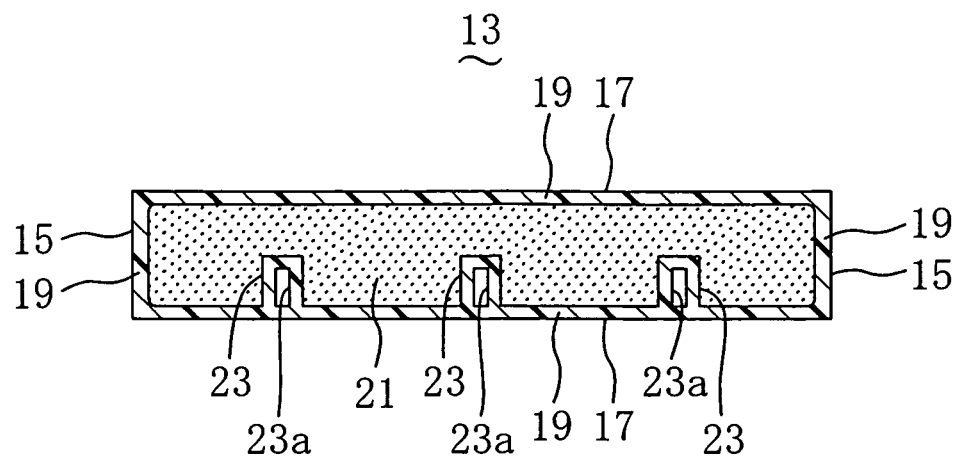
FIG. 10 is a cross-sectional view taken along the line X-X in FIG. 11.
Figure 11:
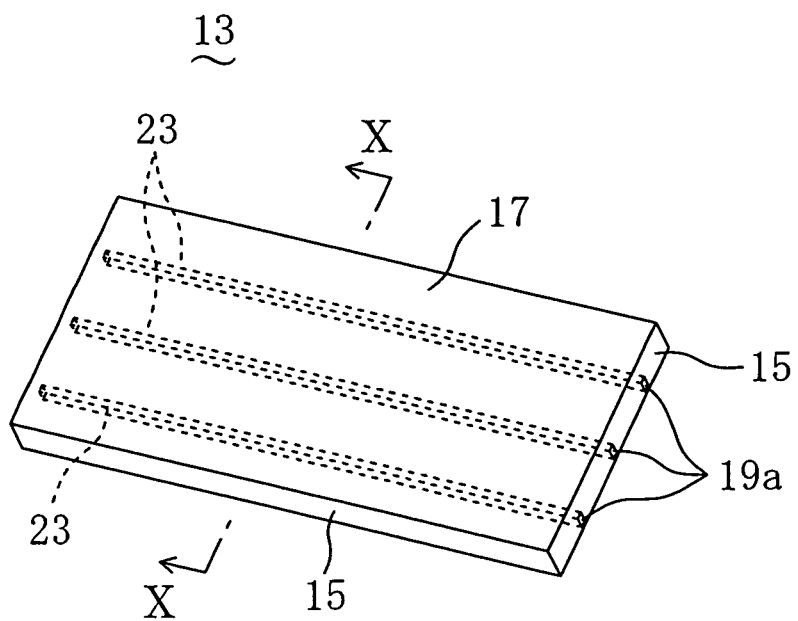
FIG. 11 is a perspective view of a package tray according to Embodiment 3 of the invention.
Figure 12A:
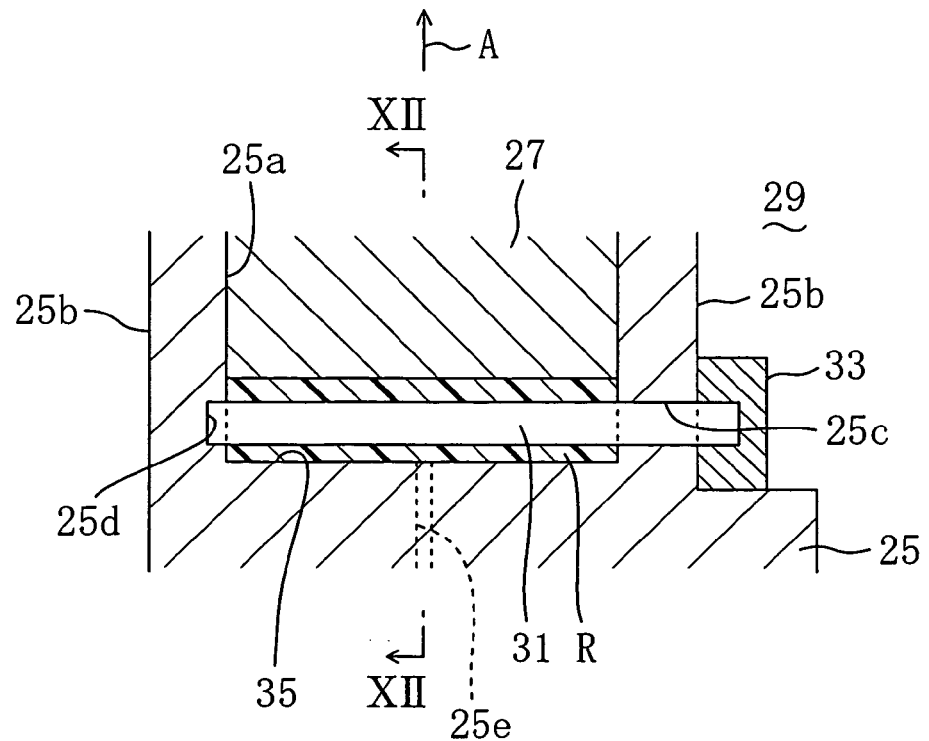
FIG. 12A is a cross-sectional view of a mold assembly in one step of a manufacturing method for the package tray according to Embodiment 3 in which a thermoplastic resin is injected in the cavity of the mold assembly to fill it and FIG. 12B is a cross-sectional view taken along the line XII-XII in FIG. 12A.
Figure 12B:
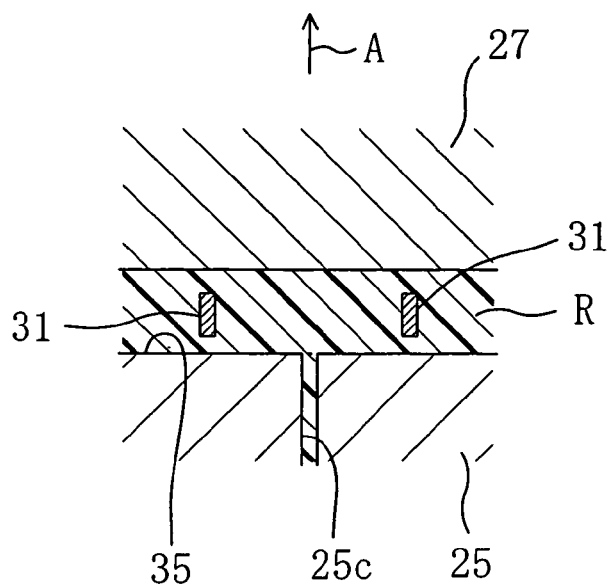
Figure 13A:
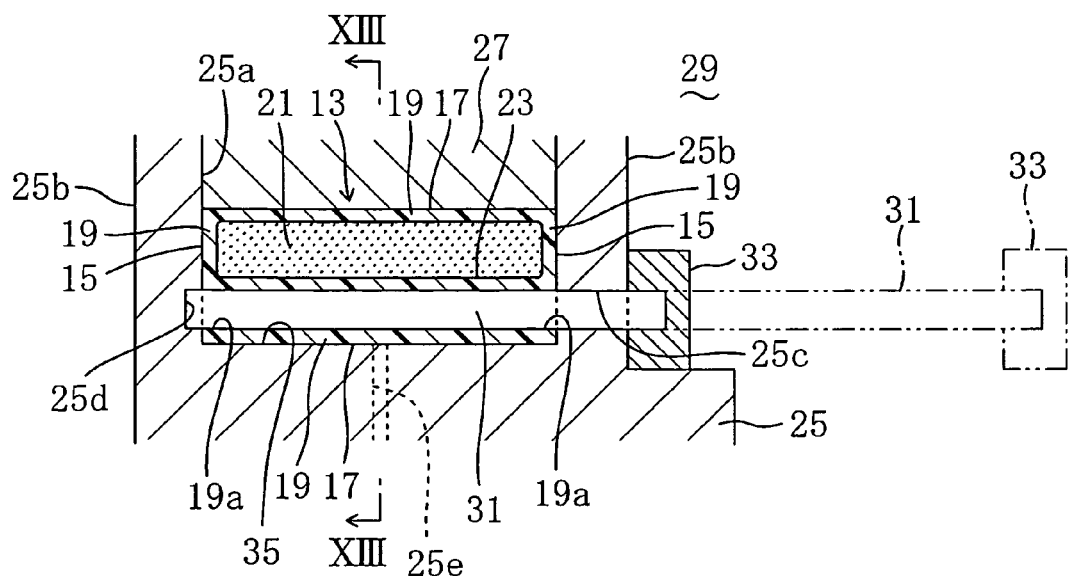
FIG. 13A is a cross-sectional view of the mold assembly in another step of the manufacturing method for the package tray according to Embodiment 3 in which a movable mold of the mold assembly is retracted and a package tray is molded in the mold cavity and FIG. 13B is a cross-sectional view taken along the line XIII-XIII in FIG. 13A.
Figure 13B:
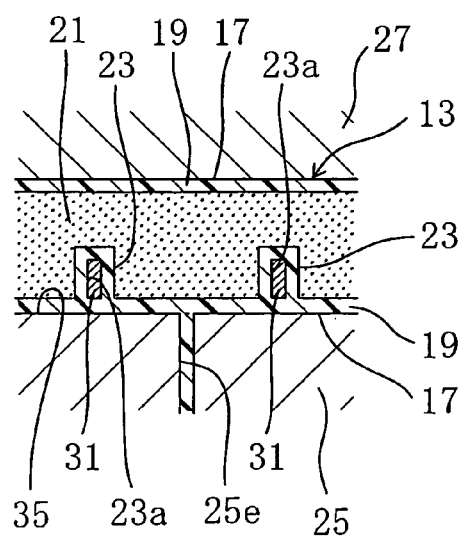

FIGS. 10 and 11 show a rectangular package tray 13 according to Embodiment 3 and FIGS. 12 and 13 show a mold assembly in different manufacturing steps for the package tray 13. Embodiment 3 is different from Embodiment 1 in that the hollow ribs 23 have a rectangular tubular shape, that the hollow ribs 23 are integral and continuous with the skin layer 19 at the surface 17 located opposite the direction of expansion of the thermoplastic resin R (at the lower surface of the package tray 13 in FIG. 10) and that the core pins 31 have the shape of a plate of rectangular section. The other structures are the same as in Embodiment 1. Therefore, the same components are indicated by the same reference numerals and a description thereof is not given. In a state that the core pins 31 are set in the cavity 35, the distance between the core pins 31 and the bottom of the concavity 25a of the stationary mold 25 is selected at a distance that the expanded layer 21 cannot be formed between them (i.e., at a distance corresponding to the thickness of the skin layer 19). The manufacturing method for the package tray 13 is the same as in Embodiment 1 and, therefore, a description thereof is not given.

Thus, according to Embodiment 3, not only the same effects as in Embodiment 1 can be obtained but also the package tray 13 can enhance its rigidity at the surface side thereof across which the hollow ribs 23 bridge (are formed continuously), thereby further enhancing the rigidity of the entire package tray 13.

Embodiment 4

Figure 14:
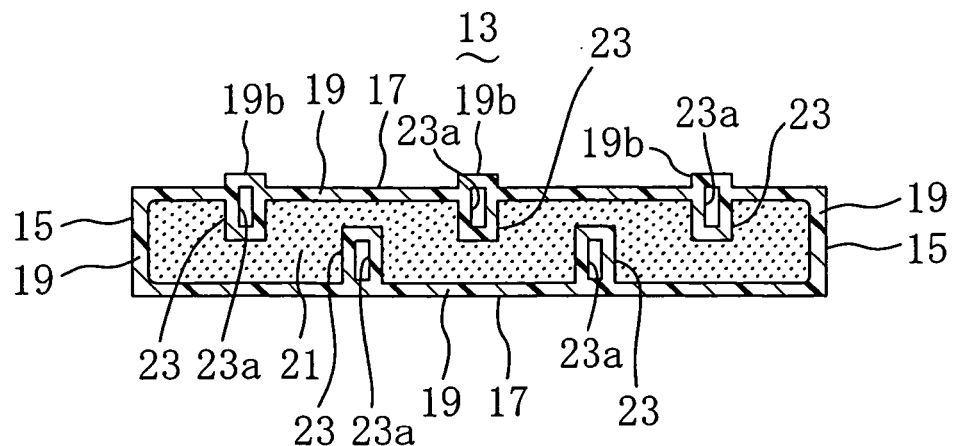
FIG. 14 is a cross-sectional view taken along the line XIV-XIV in FIG. 15.
Figure 15:
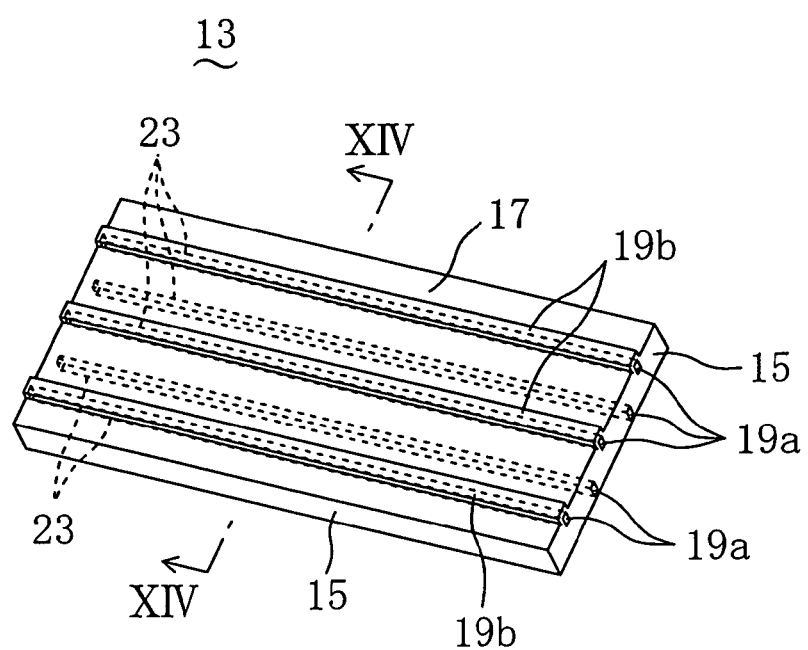
FIG. 15 is a perspective view of a package tray according to Embodiment 4 of the invention.
Figure 16A:
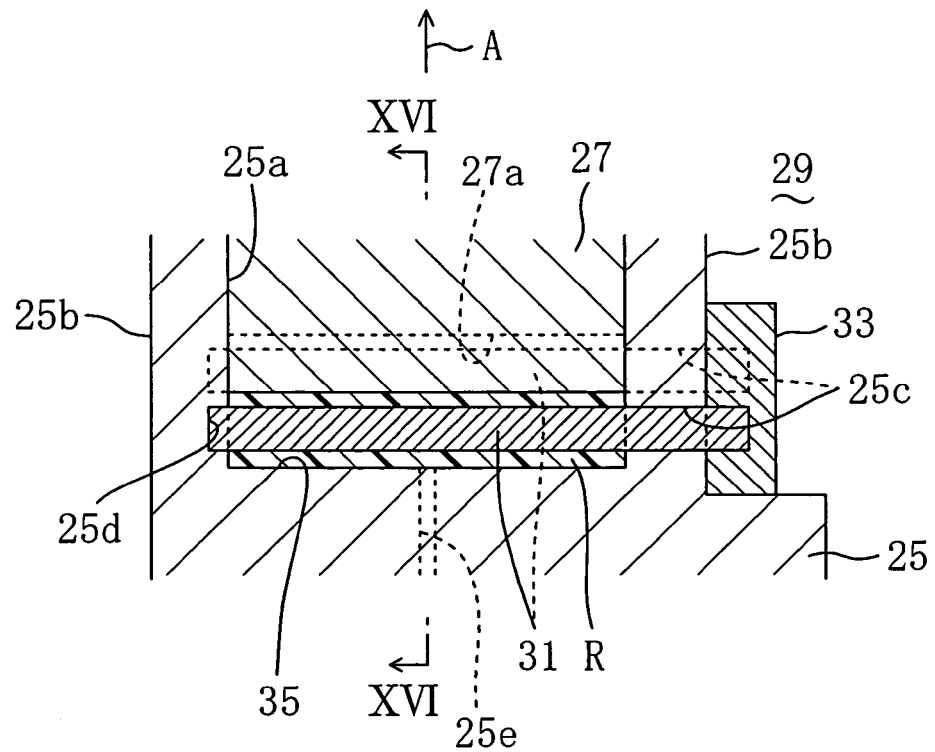
FIG. 16A is a cross-sectional view of a mold assembly in one step of a manufacturing method for the package tray according to Embodiment 4 in which a thermoplastic resin is injected in the cavity of the mold assembly to fill it and FIG. 16B is a cross-sectional view taken along the line XVI-XVI in FIG. 16A.
Figure 16B:
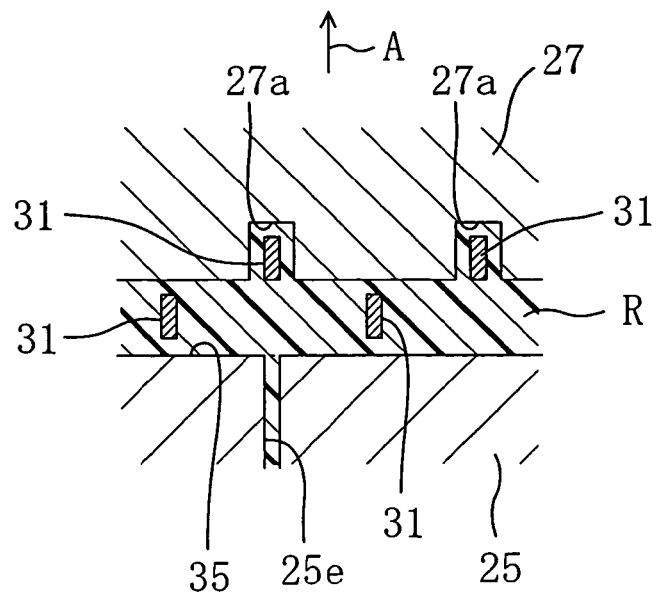
Figure 17A:
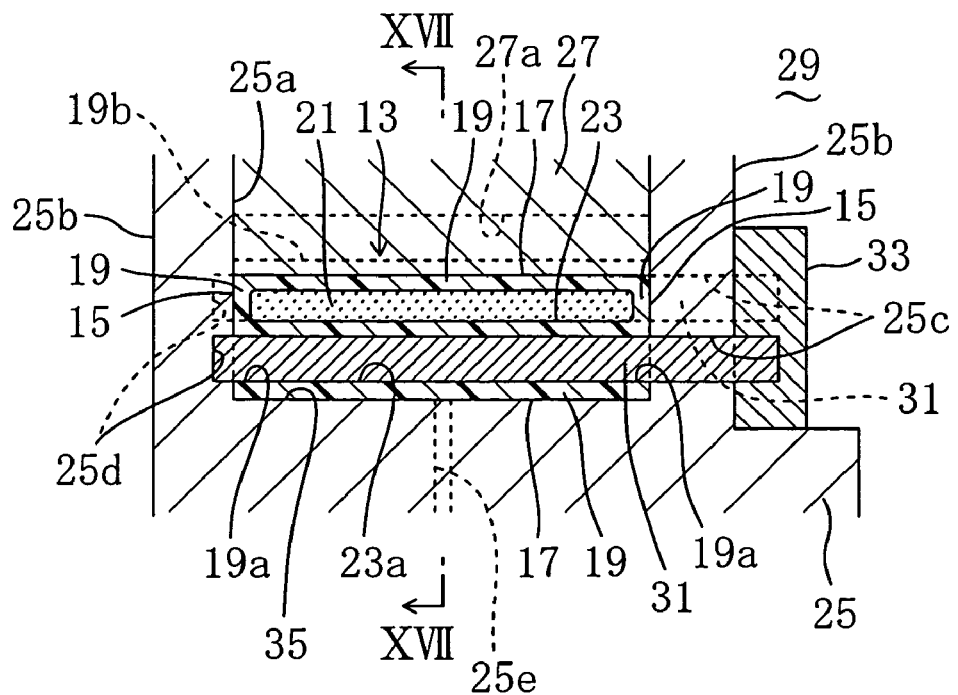
FIG. 17A is a cross-sectional view of the mold assembly in another step of the manufacturing method for the package tray according to Embodiment 4 in which a movable mold of the mold assembly is retracted and a package tray is molded in the mold cavity and FIG. 17B is a cross-sectional view taken along the line XVII-XVII in FIG. 17A.
Figure 17B:
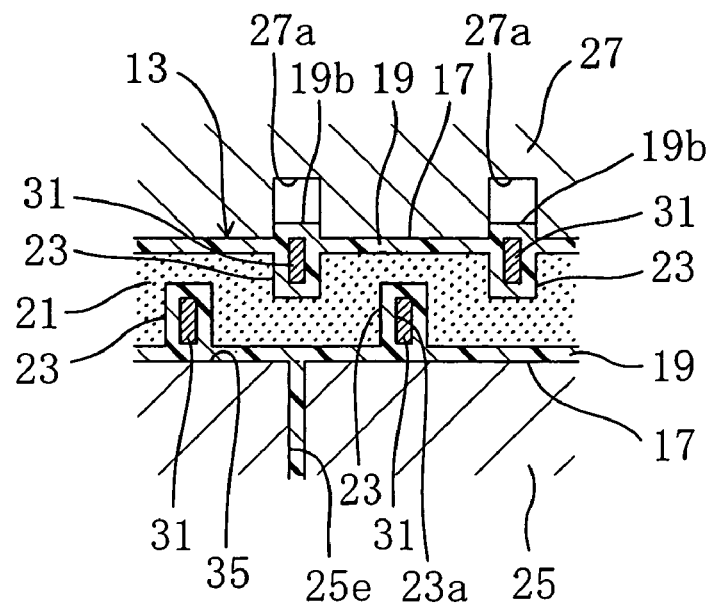
Figure 18:
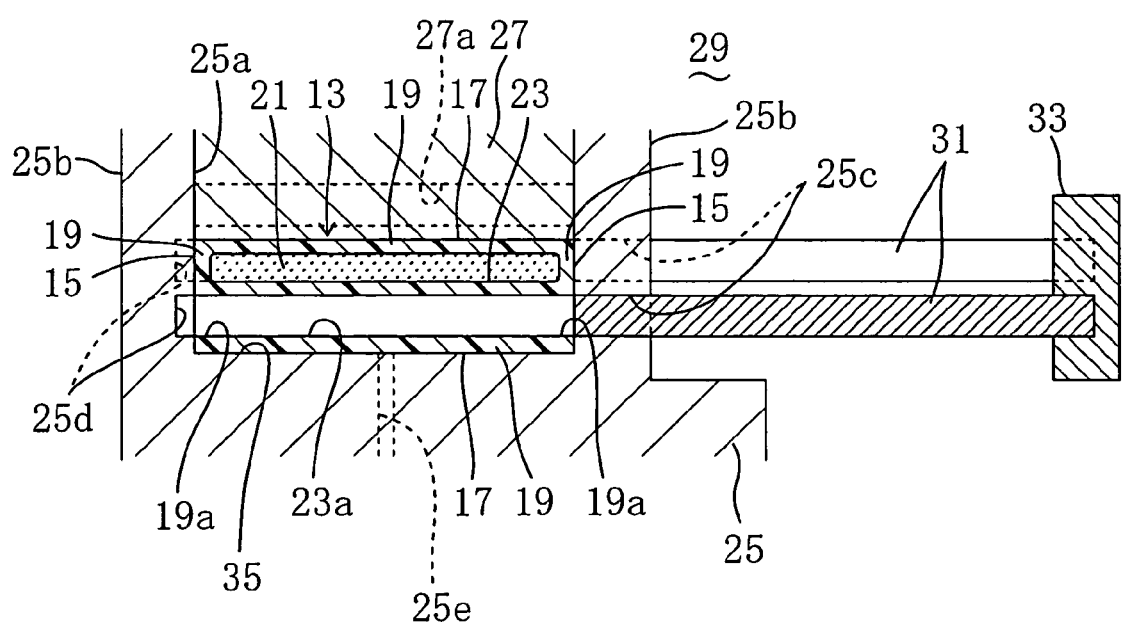
FIG. 18 is a cross-sectional view of the mold assembly in still another step of the manufacturing method for the package tray according to Embodiment 4 in which core pins are pulled out of hollows of hollow ribs.

FIGS. 14 and 15 show a rectangular package tray 13 according to Embodiment 4 and FIGS. 16 to 18 show a mold assembly in different manufacturing steps for the package tray 13. In Embodiment 4, two hollow ribs 23 of rectangular tubular shape are formed apart from each other in the car front-to-rear direction and integral and continuous with the skin layer 19 at the surface 17 located opposite the direction of expansion of the thermoplastic resin R (at the lower surface of the package tray 13 in FIG. 14), three hollow tubes 23 of rectangular tubular shape are formed at spaced intervals in the car front-to-rear direction and integral and continuous with the skin layer 19 at the surface 17 located in front of the direction of expansion of the thermoplastic resin R (at the upper surface of the package tray 13 in FIG. 14), and the hollow ribs 23 toward upper one of the opposed surfaces 17 are alternated with the hollow ribs 23 toward the lower surface 17. Further, the portions of the skin layer 19 overlying the hollow ribs 23 in front of the direction of expansion of the thermoplastic resin R (located at the upper surface of the package tray 13 in FIG. 14) are projected from the skin layer 19 to form ridges 19b. Therefore, the hollow ribs 23 at the upper surface 17 of the package tray 13 in FIG. 14 have a smaller depth into the expanded layer 21 by the amount of projection of the ridges 19b than the hollow ribs 23 at the lower surface 17 of the package tray 13 in FIG. 14.

In the mold assembly 29, three rectangular valleys 27a are formed in the molding surface of the movable mold 27 of Embodiment 1. Further, three core pins 31 are disposed at spaced intervals toward one side of the cavity 35 toward which the thermoplastic resin R expands, to get in the rectangular valleys 27a, respectively, while two core pins 31 are disposed away from each other and toward the other side of the cavity 35 away from which the thermoplastic resin R expands. In addition, the three core pins 31 toward the one side of the cavity 35 and the two core pins 31 on the other side thereof are alternated along the opposed surfaces 17. When the package tray 13 is molded, the molding surface of the movable mold 27 is retracted, in expansion molding, from the position shown in FIG. 16B to the position shown in FIG. 17B, namely, up to the upper ends of the three core pins 31 toward which the thermoplastic resin R expands. Thus, after the movable mold 27 retracts as shown in FIG. 17, portions of the skin layer 19 having been formed on the upper ends of the three core pins 31 toward which the thermoplastic resin R expands before the retraction of the movable mold 27, (though the portions of the skin layer 19 provides ridges 19b of the molded package tray 13), are still located in the valleys 27a of the movable mold 27 even when the thermoplastic resin R expands and the expansion pressure acts toward the portions of the skin layer 19. In addition, the three core pins 31 are located facing the openings of the valleys 27a, respectively. Therefore, the portions of the skin layer 19 are not much affected by the expansion pressure and the ridges 19b are formed while ensuring their proper configurations, which provides a good appearance of the portions of the surface 17 under which the hollow ribs 23 are formed. The other manufacturing steps are the same as in Embodiment 1 and, therefore, a description thereof is not given.

According to Embodiment 4, not only the same effects as in Embodiment 1 can be obtained but also the upper and lower surfaces 17 of the package tray 13 formed integral and continuous with hollow ribs 23 can further enhance their rigidity, thereby enhancing the rigidity of the entire package tray 13. Further, since the ridges 19b projecting from the skin layer 19 at one surface 17 are formed, this avoids deterioration of the appearance of portions of the surface 17 under which the hollow ribs 23 are formed and enables easy production of a package tray 13 providing no deteriorated appearance with a simple control of the amount of retraction of the movable mold 27.

Embodiment 5

Figure 19:
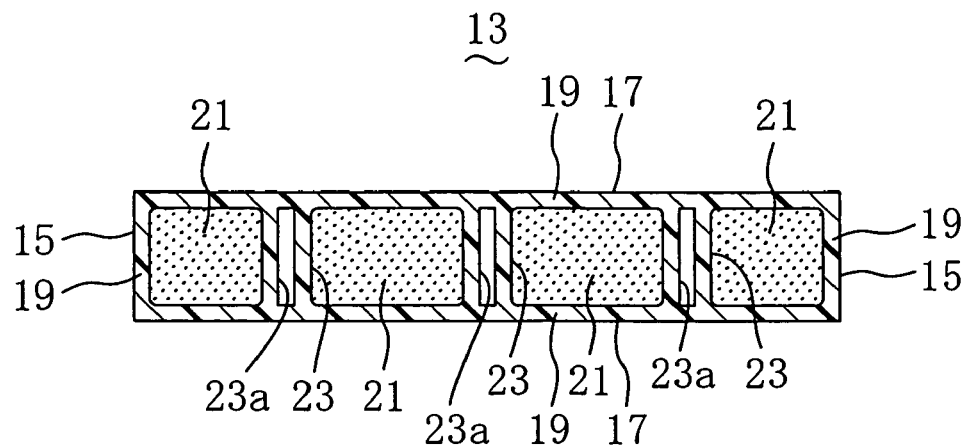
FIG. 19 is a cross-sectional view taken along the line XIX-XIX in FIG. 20.
Figure 20:
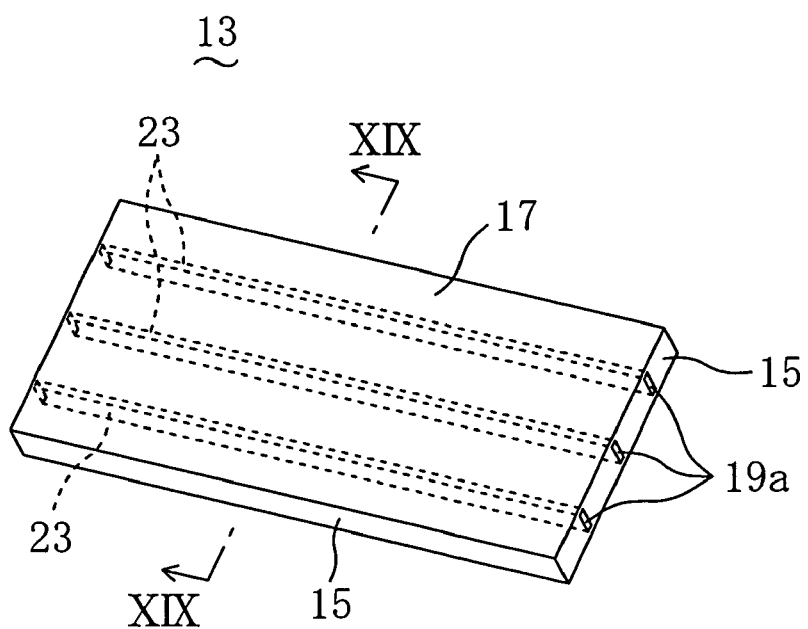
FIG. 20 is a perspective view of a package tray according to Embodiment 5 of the invention.
Figure 21A:
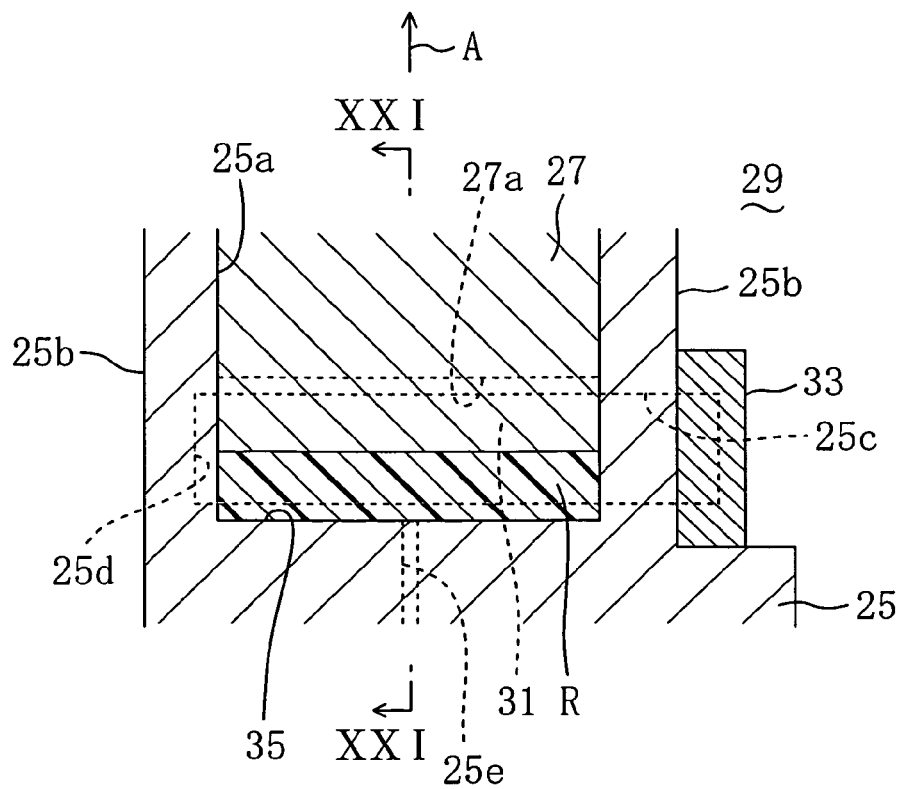
FIG. 21A is a cross-sectional view of a mold assembly in one step of a manufacturing method for the package tray according to Embodiment 5 in which a thermoplastic resin is injected in the cavity of the mold assembly to fill it and FIG. 21B is a cross-sectional view taken along the line XXI-XXI in FIG. 21A.
Figure 21B:
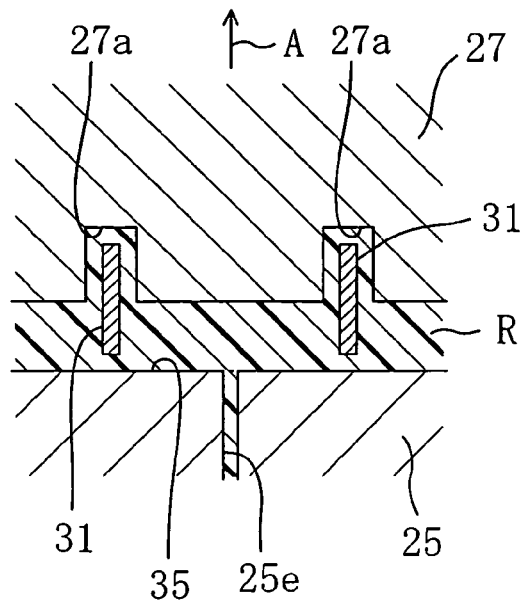
Figure 22A:
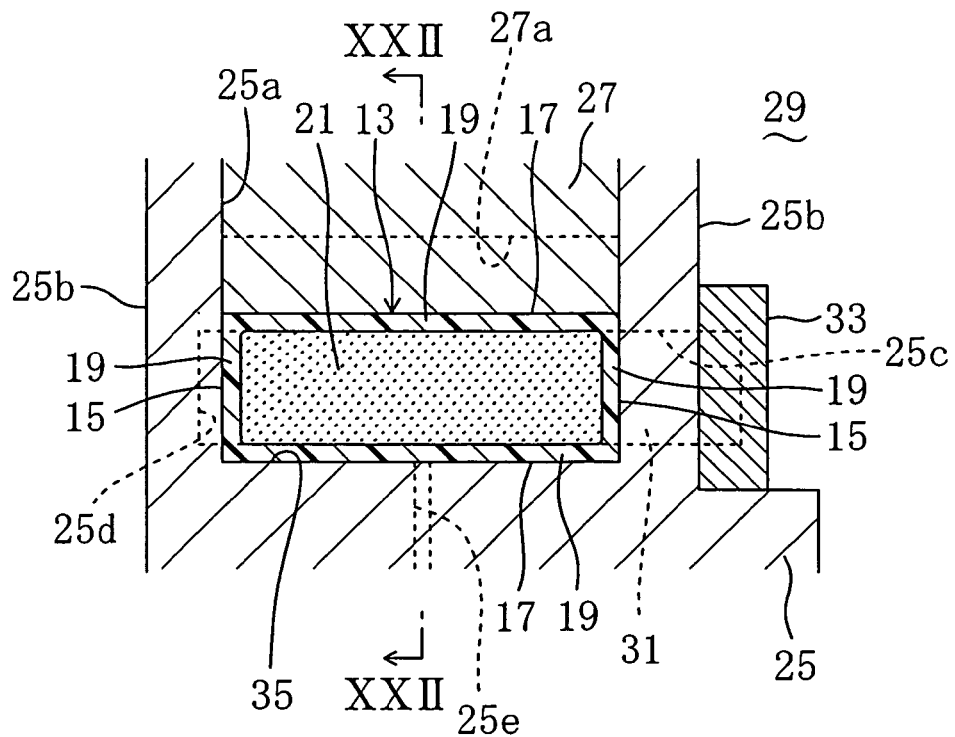
FIG. 22A is a cross-sectional view of the mold assembly in another step of the manufacturing method for the package tray according to Embodiment 5 in which a movable mold of the mold assembly is retracted and a package tray is molded in the mold cavity and FIG. 22B is a cross-sectional view taken along the line XXII-XXII in FIG. 22A.
Figure 22B:
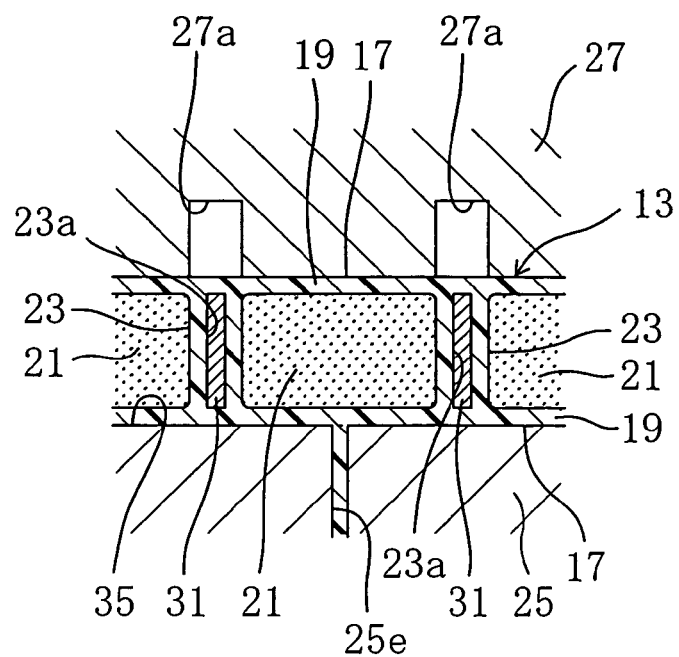

FIGS. 19 and 20 show a rectangular package tray 13 according to Embodiment 5 and FIGS. 21 and 22 show a mold assembly in different manufacturing steps for the package tray 13. In Embodiment 5, three hollow ribs 23 of rectangular tubular shape are formed along the sides 15 to be longer in the direction of thickness of the package tray 13 than those of Embodiment 3 and formed integral and continuous with the skin layer 19 at both the surfaces 17 located in front of and opposite the direction of expansion of the thermoplastic resin R (at the upper and lower surfaces of the package tray 13 in FIG. 19). Further, unlike Embodiment 4 in which ridges 19b are formed to project from the surface 17 in front of the direction of expansion of the thermoplastic resin R and correspondingly to the hollow ribs 23, the surface 17 is flat as a whole.

In the mold assembly 29, three rectangular valleys 27a are formed in the molding surface of the movable mold 27 to be deeper than those of Embodiment 4 according to the dimension of the hollow ribs 23 in the direction of the thickness of the package tray 13. The dimension of the three core pins 31 in the direction of the thickness of the package tray 13 is also longer than that of Embodiment 3 according to the hollows 23a of the hollow ribs 23. The dimension of the three core pins 31 in the direction of the thickness of the package tray 13 (i.e., the width of the three core pins 31) is selected to be slightly smaller than the width of the enlarged cavity 35 (the height of the cavity 35 in FIG. 22) so that in the mold closing position, as shown in FIG. 21, substantially the upper half of the core pin 31 is accommodated in the associated rectangular valley 27a and spaced apart from its bottom and substantially the lower half projects into the cavity 35 and during expansion molding in which the movable mold 27 is retracted, as shown in FIG. 22, the entire core pin 31 is accommodated in the cavity 35. When the package tray 13 is molded, the molding surface of the movable mold 27 is retracted, in expansion molding, from the position shown in FIG. 21 to the position shown in FIG. 22, namely, upward by a distance corresponding to the thickness of the skin layer 19 from the upper ends of the core pins 31 toward which the thermoplastic resin R expands, more namely, up to the level of the bottoms of the valleys 27a in FIG. 21. The other manufacturing steps are the same as in Embodiment 1 and, therefore, a description thereof is not given.

Thus, according to Embodiment 5, not only the same effects as in Embodiment 1 can be obtained but also the package tray 13 can be further enhanced in rigidity by the hollow ribs 23 integral and continuous formed with both the opposed surfaces 17 to bridge the distance therebetween.

Embodiment 6

Figure 23:
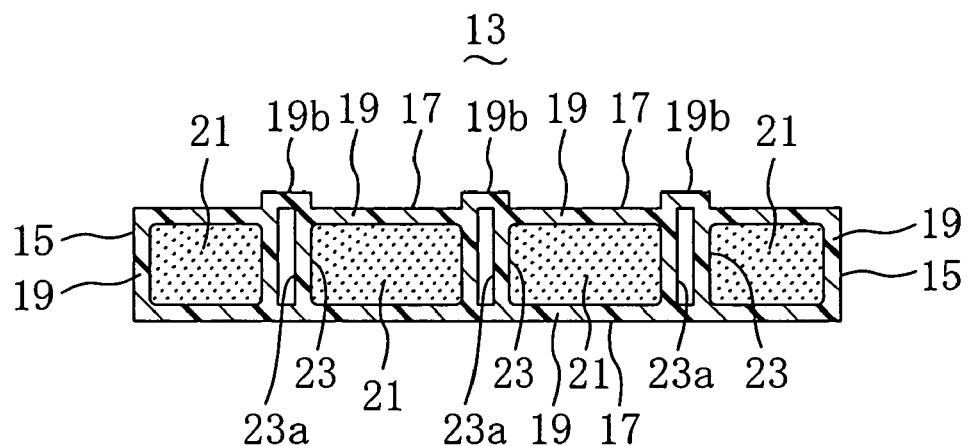
FIG. 23 is a cross-sectional view taken along the line XXIII-XXIII in FIG. 24.
Figure 24:
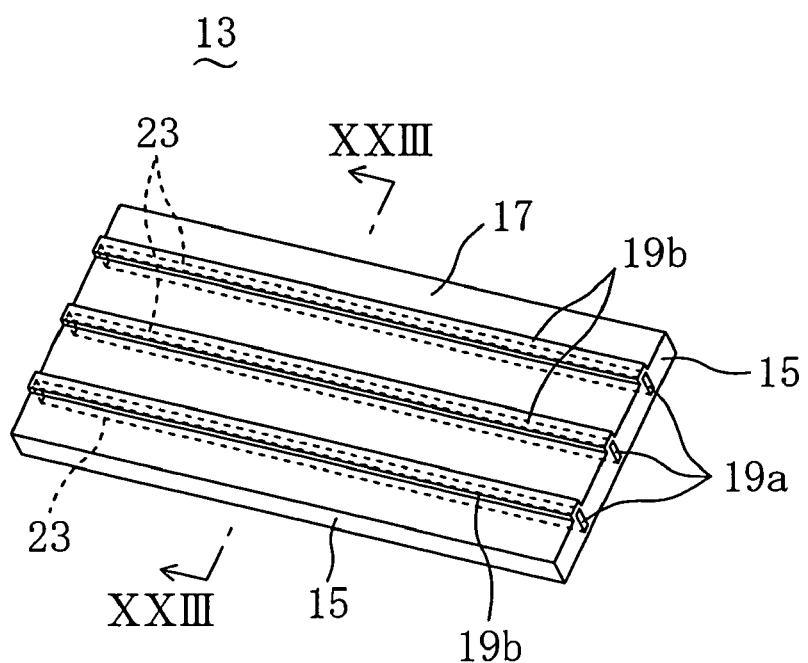
FIG. 24 is a perspective view of a package tray according to Embodiment 6 of the invention.
Figure 25A:
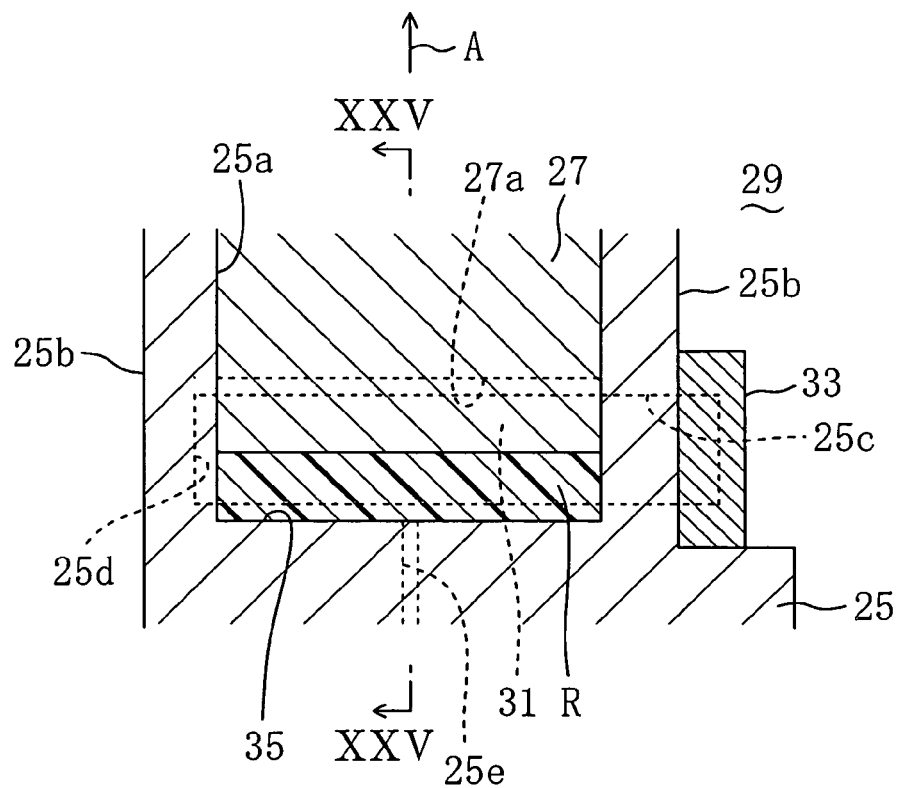
FIG. 25A is a cross-sectional view of a mold assembly in one step of a manufacturing method for the package tray according to Embodiment 6 in which a thermoplastic resin is injected in the cavity of the mold assembly to fill it and FIG. 25B is a cross-sectional view taken along the line XXV-XXV in FIG. 25A.
Figure 25B:
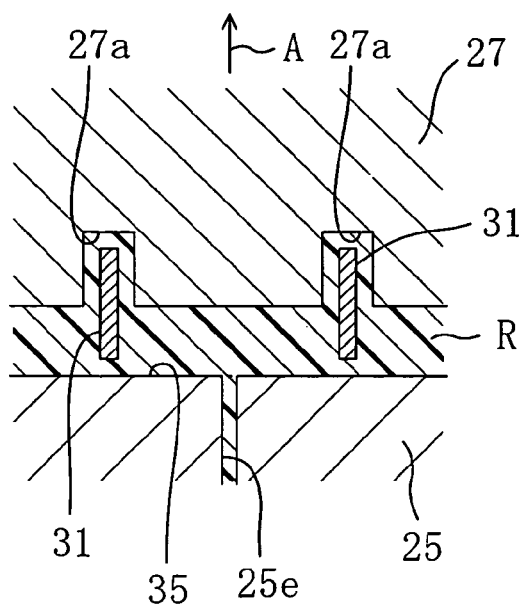
Figure 26A:
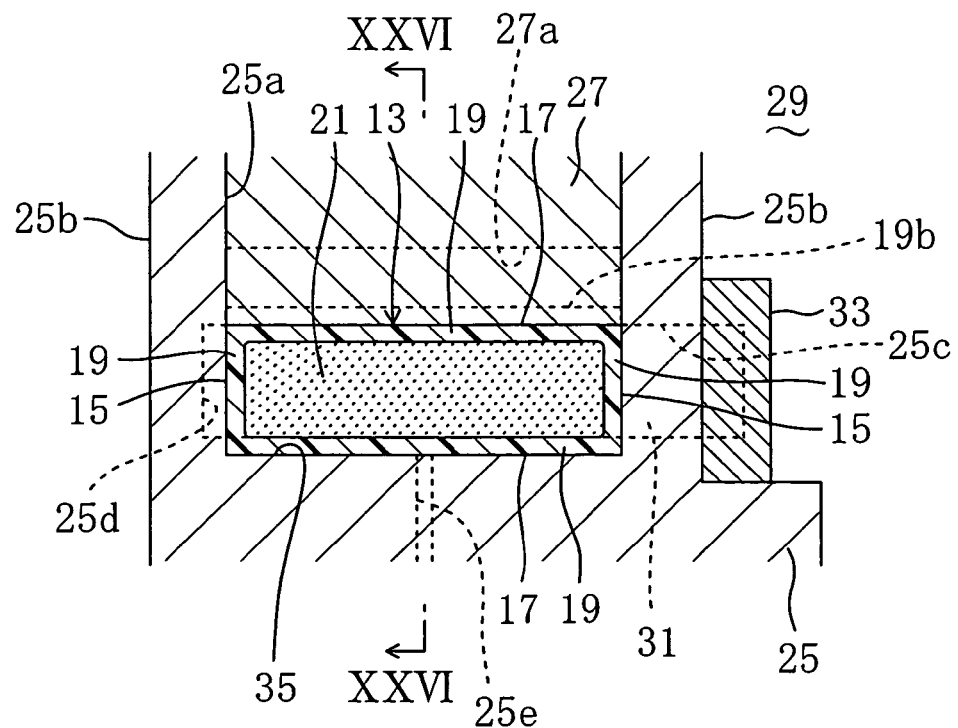
FIG. 26A is a cross-sectional view of the mold assembly in another step of the manufacturing method for the package tray according to Embodiment 6 in which a movable mold of the mold assembly is retracted and a package tray is molded in the mold cavity and FIG. 26B is a cross-sectional view taken along the line XXVI-XXVI in FIG. 26A.
Figure 26B:
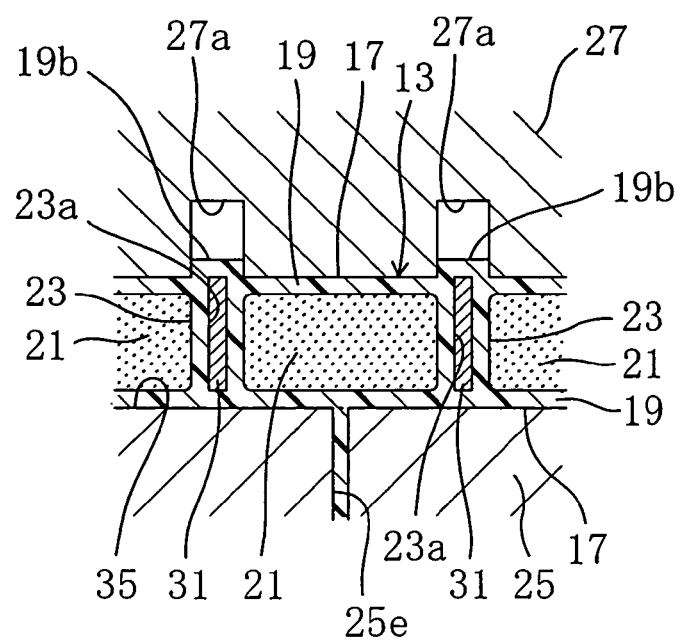

FIGS. 23 and 24 show a rectangular package tray 13 according to Embodiment 6 and FIGS. 25 and 26 show a mold assembly in different manufacturing steps for the package tray 13. In Embodiment 6, like Embodiment 5, three hollow ribs 23 of rectangular tubular shape are formed integral and continuous with the skin layer 19 at both the surfaces 17 located in front of and opposite the direction of expansion of the thermoplastic resin R (at the upper and lower surfaces of the package tray 13 in FIG. 23). However, unlike Embodiment 5, one sides of the hollows 23a of the hollow ribs 23 extend to the surface 17 in front of the direction of expansion of the thermoplastic resin R and portions of the skin layer 19 located at the same surface 17 and corresponding to the hollow ribs 23 project from the surface 17 as in Embodiment 4 to form ridges 19b. The structure of the mold assembly 29 is the same as that in Embodiment 5. However, when the package tray 13 is molded, like Embodiment 4, the molding surface of the movable mold 27 is retracted, in expansion molding, from the position shown in FIG. 25 to the position shown in FIG. 26, namely, up to the upper ends of the three core pins 31. The other manufacturing steps are the same as in Embodiment 1 and, therefore, a description thereof is not given.

Thus, according to Embodiment 6, the same effects as in Embodiment 1 can be exhibited.

Further, according to Embodiment 6, like Embodiment 5, the hollow ribs 23 are formed integral and continuous with the upper and lower surfaces 17 of the package tray 13 to bridges the distance therebetween, which enhances the rigidity of the package tray 13. Further, like Embodiment 4, since the ridges 19b projecting from the skin layer 19 at one surface 17 are formed, this avoids deterioration of the appearance of portions of the surface 17 under which the hollow ribs 23 are formed and enables easy production of a package tray 13 providing no deteriorated appearance with a simple control of the amount of retraction of the movable mold 27.

Embodiment 7

Figure 27:
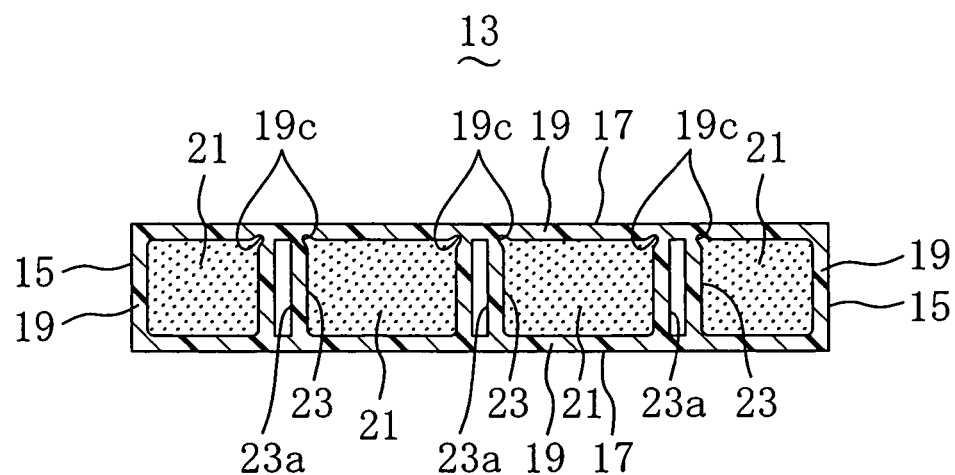
FIG. 27 is a cross-sectional view taken along the line XXVII-XXVII in FIG. 28.
Figure 28:
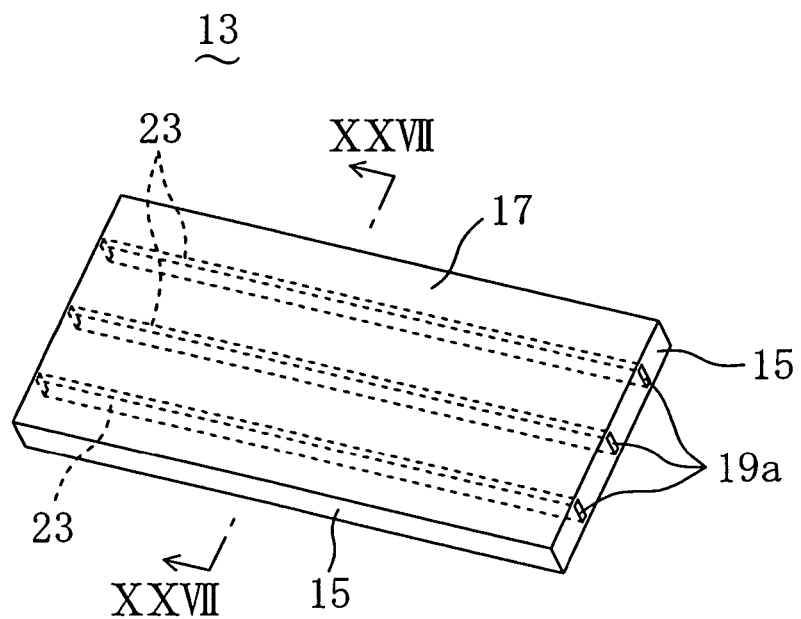
FIG. 28 is a perspective view of a package tray according to Embodiment 7 of the invention.
Figure 29A:
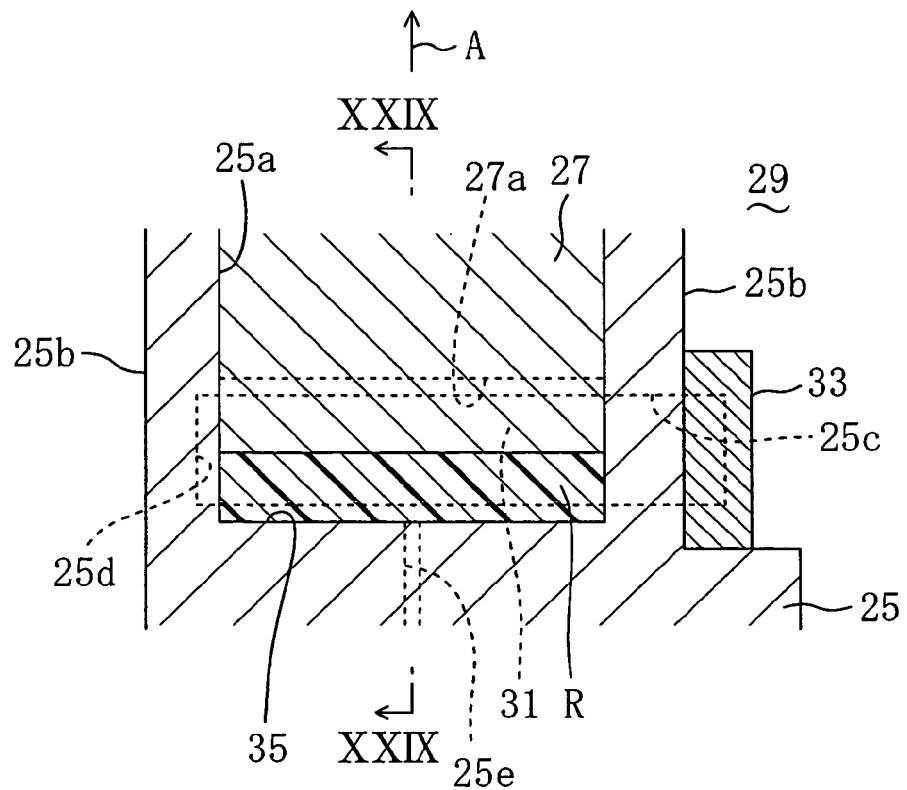
FIG. 29A is a cross-sectional view of a mold assembly in one step of a manufacturing method for the package tray according to Embodiment 7 in which a thermoplastic resin is injected in the cavity of the mold assembly to fill it and FIG. 29B is a cross-sectional view taken along the line XXIX-XXIX in FIG. 29A.
Figure 29B:
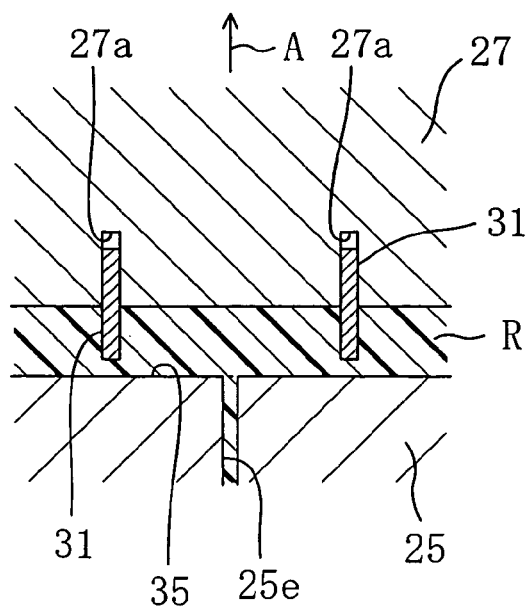
Figure 30A:
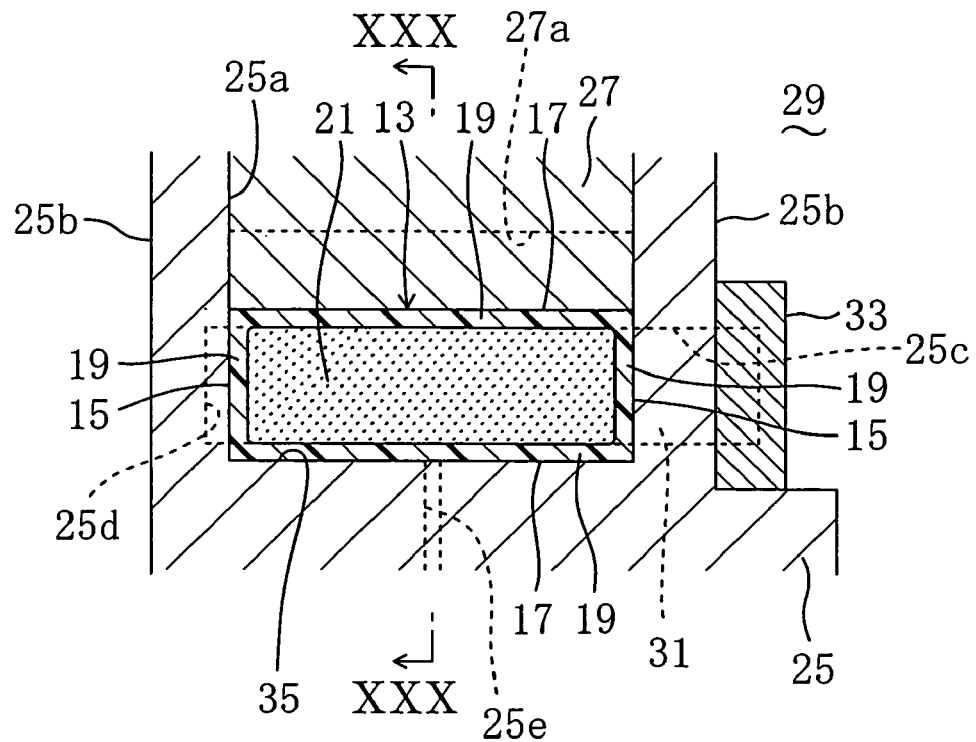
FIG. 30A is a cross-sectional view of the mold assembly in another step of the manufacturing method for the. package tray according to Embodiment 7 in which a movable mold of the mold assembly is retracted and a package tray is molded in the mold cavity
Figure 30B:
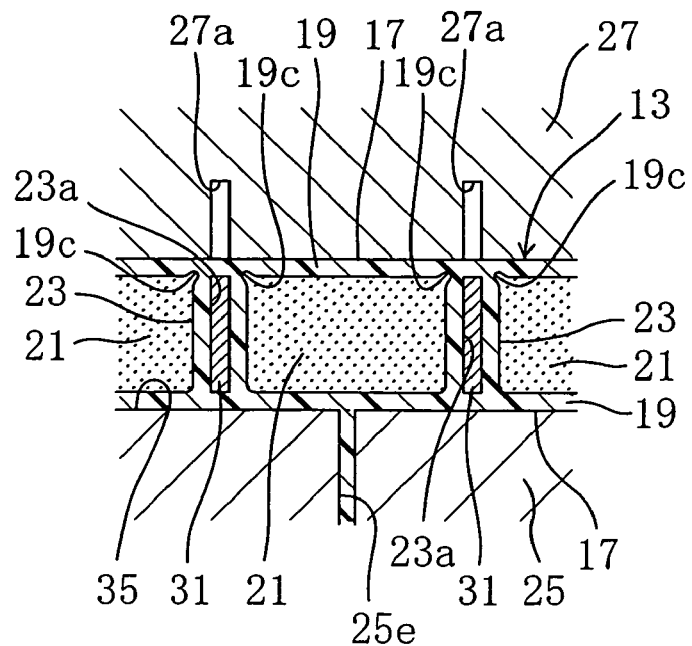
FIG. 30B is a cross-sectional view taken along the line XXX-XXX in FIG. 30A.

FIGS. 27 and 28 show a rectangular package tray 13 according to Embodiment 7 and FIGS. 29 and 30 show a mold assembly in different manufacturing steps for the package tray 13. Embodiment 7 is the same as Embodiment 5 in that three hollow ribs 23 of rectangular tubular shape are formed continuous with the skin layer 19 at both the surfaces 17 located in front of and opposite the direction of expansion of the thermoplastic resin R (at the upper and lower surfaces of the package tray 13 in FIG. 27) and that the skin layer 19 has no ridges projecting from the surface 17 in front of the direction of expansion of the thermoplastic resin R but the surface 17 is flat as a whole. However, unlike Embodiments 5 and 6, the width of the three rectangular valleys 27a formed in the molding surface of the movable mold 27 is selected smaller to an extent that each core pin 31 is placed in with substantially no space between both the side walls of the rectangular valley 27a to prevent entry of the thermoplastic resin R therein. This mold structure causes a clearance corresponding to the thickness of the skin layer 19 to be created between the rectangular valley 27a and the upper end of the core pin 31 when the movable mold 27 is retracted for expansion molding (see FIG. 30B). Thus, the thermoplastic resin R yet to be solidified enters into the clearance owing to its expansion pressure. As a result, after expansion molding, fine V grooves 19c are formed at the corners formed by the hollow ribs 23 and the surface 17 closer to the movable mold 27. The manufacturing method for the package tray 13 is the same as in Embodiment 1 and, therefore, a description thereof is not given.

Thus, according to Embodiment 7, the same effects as in Embodiment 1 can be exhibited.

Further, according to Embodiment 7, like Embodiment 5, the package tray 13 can be enhanced in rigidity by the hollow ribs 23 bridging the distance between both the opposed surfaces 17.

Furthermore, according to Embodiment 7, since the narrow width of the rectangular valleys 27a of the movable mold 27 prevents entry of the thermoplastic resin R in the rectangular valleys 27a, this prevents raised portions of the skin layer 19 disfiguring the appearance from being produced on the surface 17 located in front of the direction of expansion of the thermoplastic resin R (on the upper surface of the package tray 13 in FIG. 27) after the expansion molding.

Embodiment 8

Figure 31:
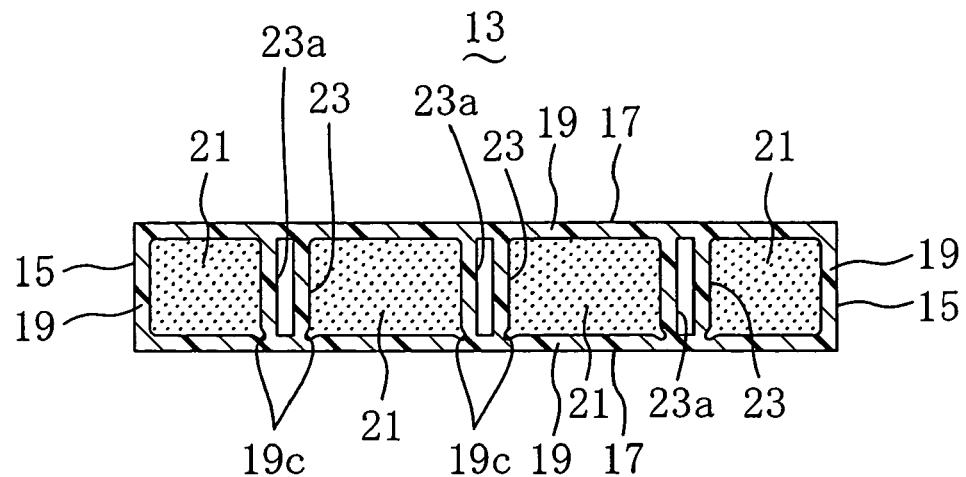
FIG. 31 is a cross-sectional view taken along the line XXXI-XXXI in FIG. 32.
Figure 32:
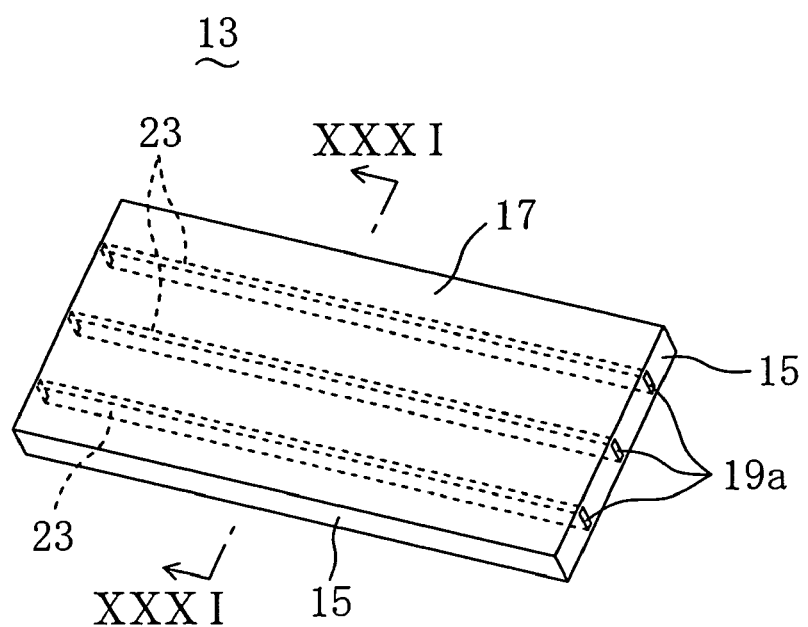
FIG. 32 is a perspective view of a package tray according to Embodiment 8 of the invention.
Figure 33A:
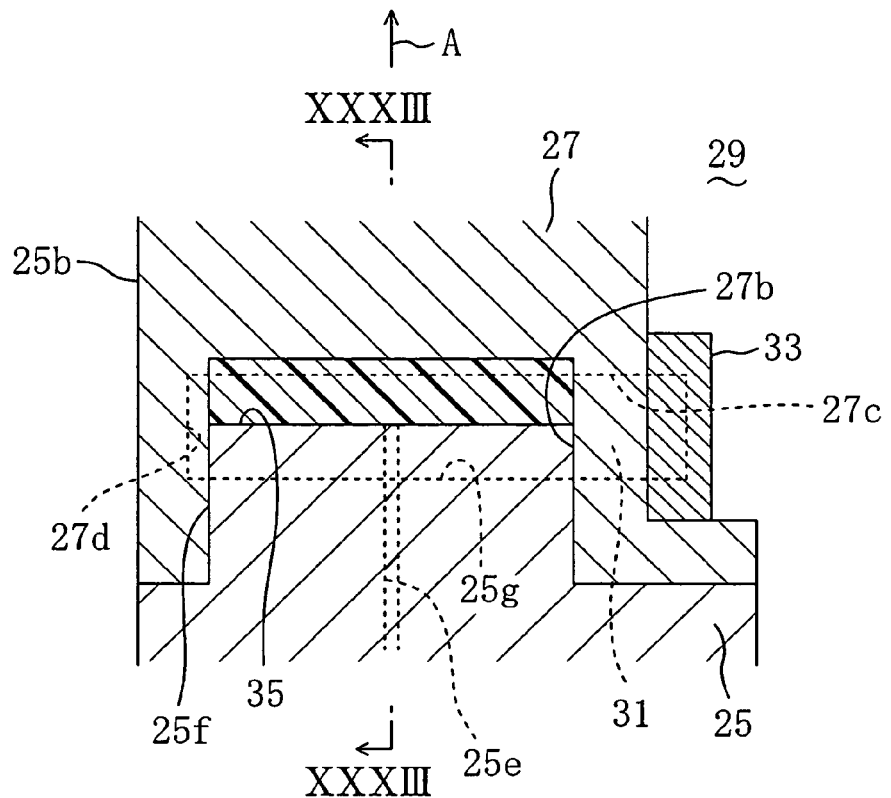
FIG. 33A is a cross-sectional view of a mold assembly in one step of a manufacturing method for the package tray according to Embodiment 8 in which a thermoplastic resin is injected in the cavity of the mold assembly to fill it and FIG. 33B is a cross-sectional view taken along the line XXXIII-XXXIII in FIG. 33A.
Figure 33B:
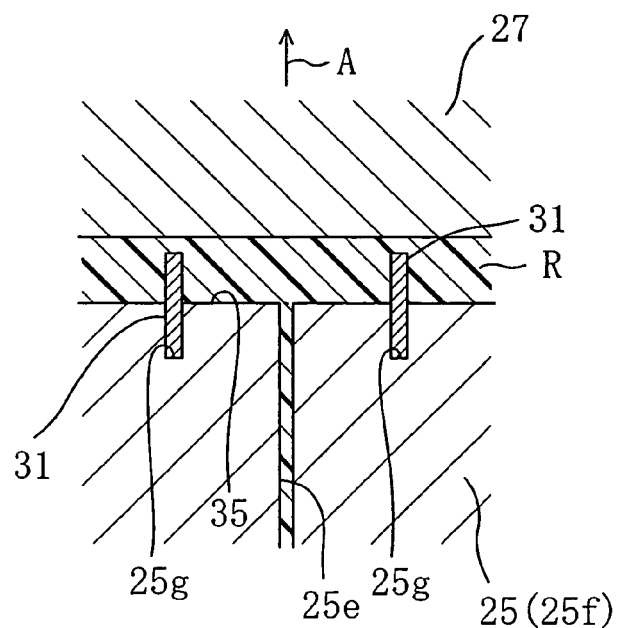
Figure 34A:
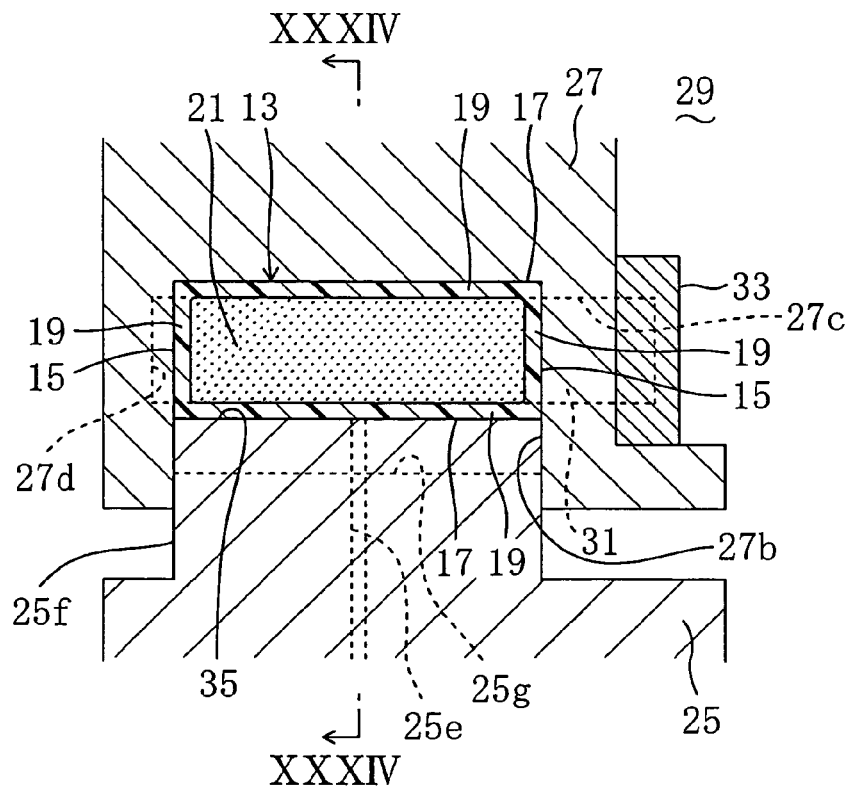
FIG. 34A is a cross-sectional view of the mold assembly in another step of the manufacturing method for the package tray according to Embodiment 8 in which a movable mold of the mold assembly is retracted and a package tray is molded in the mold cavity and FIG. 34B is a cross-sectional view taken along the line XXXIV-XXXIV in FIG. 34A.
Figure 34B:
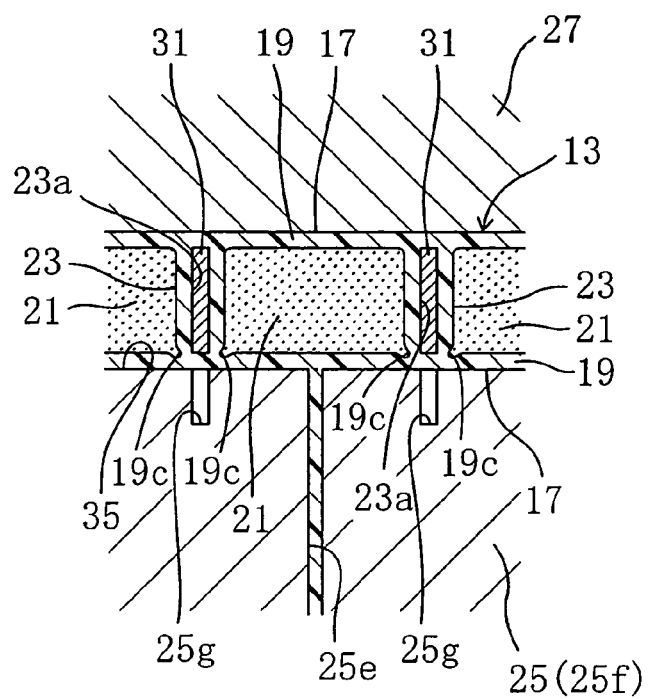

FIGS. 31 and 32 show a rectangular package tray 13 according to Embodiment 8 and FIGS. 33 and 34 show a mold assembly in different manufacturing steps for the package tray 13. Embodiment 8 is the same as Embodiment 7 except that, after expansion molding, fine V grooves 19c are formed not at the corners formed by the hollow ribs 23 and the surface 17 closer to the movable mold 27 but at the corners formed by the hollow ribs 23 and the surface 17 closer to the stationary mold 25. Therefore, in Embodiment 8, the top of the stationary mole 25 is formed with a raised part 25f and the raised part 25f is formed with rectangular valleys 25g in which substantially lower halves of the core pins 31 are held fitted until the movable mold 27 retracts up partway from the raised part 25f. Further, the movable mold 27 is formed with a recess 27b for receiving the raised part 25f to form a cavity 35 between the recess 27b and the raised part 25f. Furthermore, one of the opposed side walls of the movable mold 27 is formed with through holes 27c through which the core pins 31 can pass in and out, while the other of the opposed side walls is formed with engaging holes 27d in which the distal ends of the core pins 31 can be engaged. When the package tray 13 is molded, the movable mold 27 is retracted, in expansion molding, partway from the stationary mold 25 so that a clearance is created between the lower ends of the core pins 31 and the molding surface of the stationary mold 25 by a distance corresponding to the thickness of the skin layer 19 located at the surface 17 closer to the stationary mold 25 (see FIG. 34B). The other manufacturing steps are the same as in Embodiment 1 and, therefore, a description thereof is not given.

Thus, according to Embodiment 8, the same effects as in Embodiment 1 can be exhibited.

Further, according to Embodiment 8, like Embodiment 5, the package tray 13 can be enhanced in rigidity by the hollow ribs 23 bridging the distance between both the opposed surfaces 17.

Furthermore, according to Embodiment 8, the narrow width of the rectangular valleys 25g of the stationary mold 25 prevents entry of the thermoplastic resin R in the rectangular valleys 25g, which prevents raised portions of the skin layer 19 disfiguring the appearance from being produced on the surface 17 located opposite the direction of expansion of the thermoplastic resin R (on the lower surface of the package tray 13 in FIG. 31) after the expansion molding.

Embodiment 9

Figure 35:
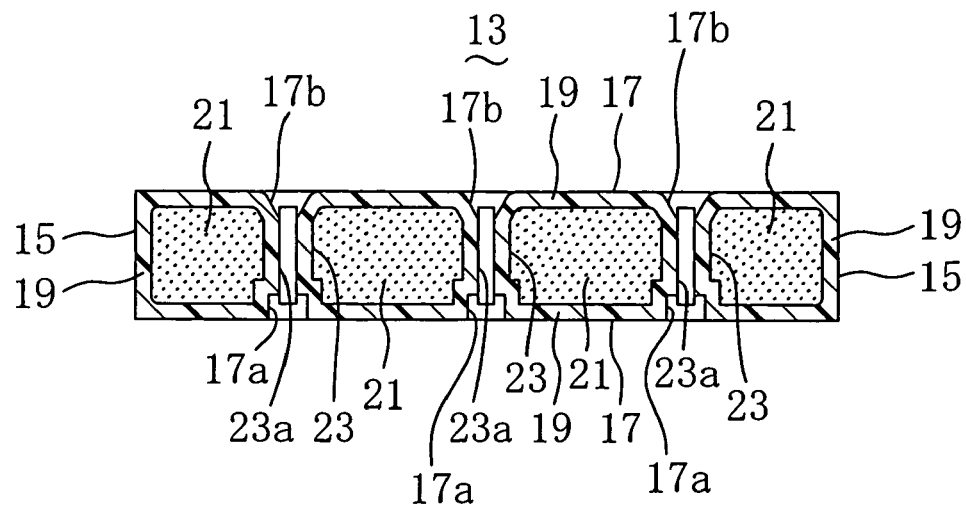
FIG. 35 is a cross-sectional view taken along the line XXXV-XXXV in FIG. 36.
Figure 36:
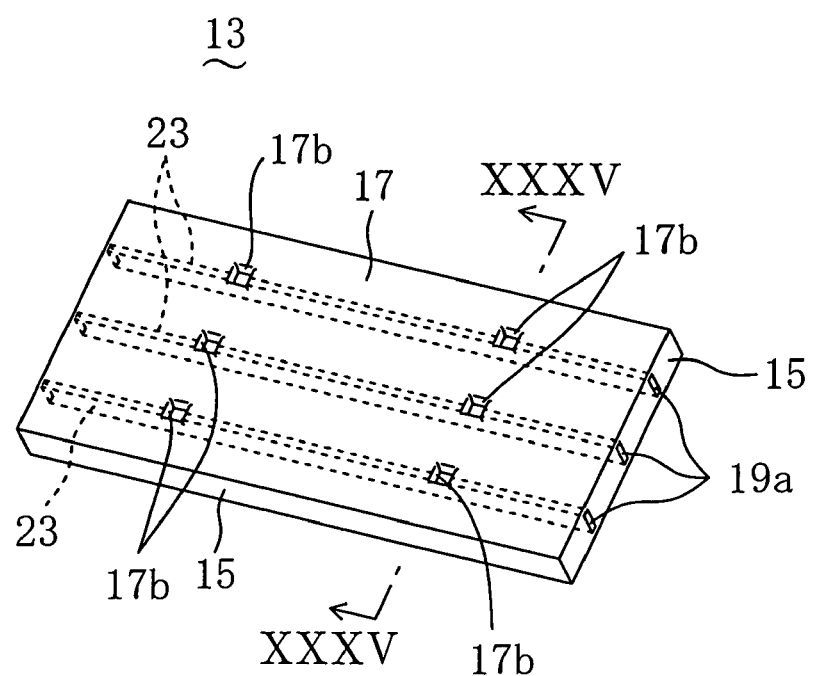
FIG. 36 is a perspective view of a package tray according to Embodiment 9 of the invention.
Figure 37A:
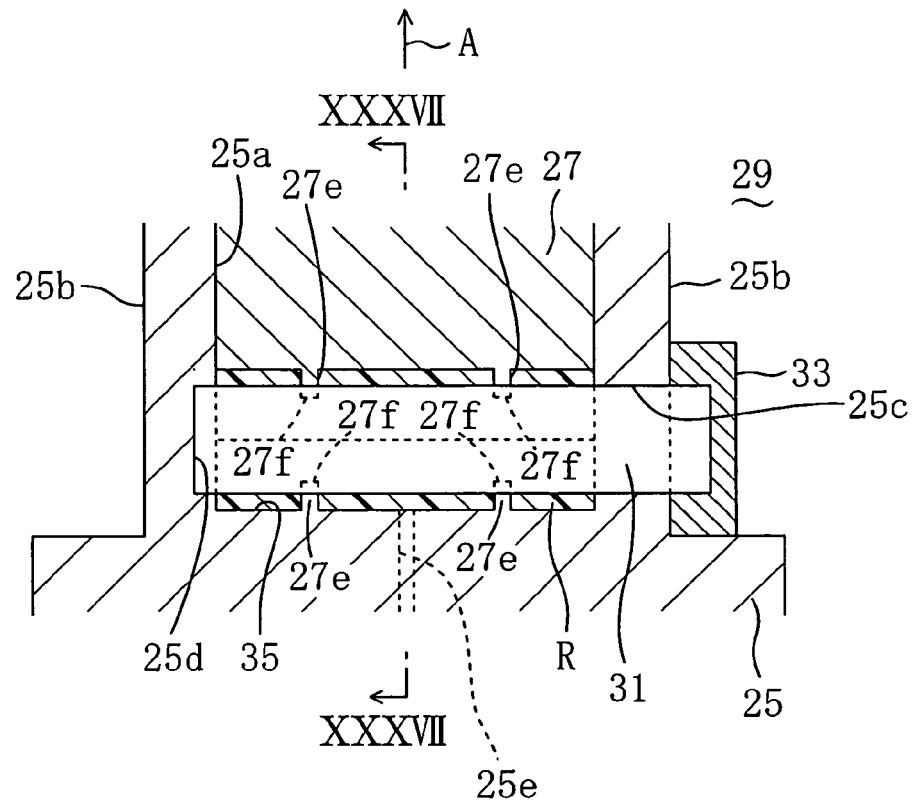
FIG. 37A is a cross-sectional view of a mold assembly in one step of a manufacturing method for the package tray according to Embodiment 9 in which a thermoplastic resin is injected in the cavity of the mold assembly to fill it and FIG. 37B is a cross-sectional view taken along the line XXXVII-XXXVII in FIG. 37A.
Figure 37B:
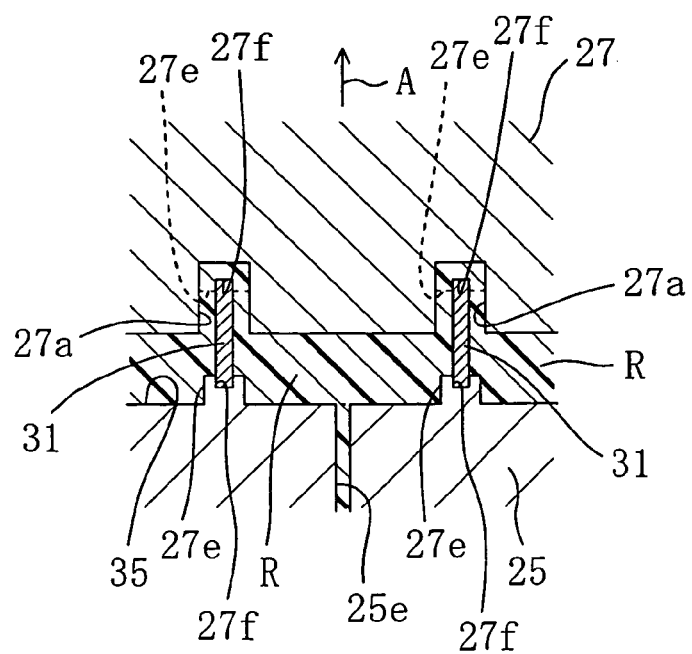
Figure 38A:
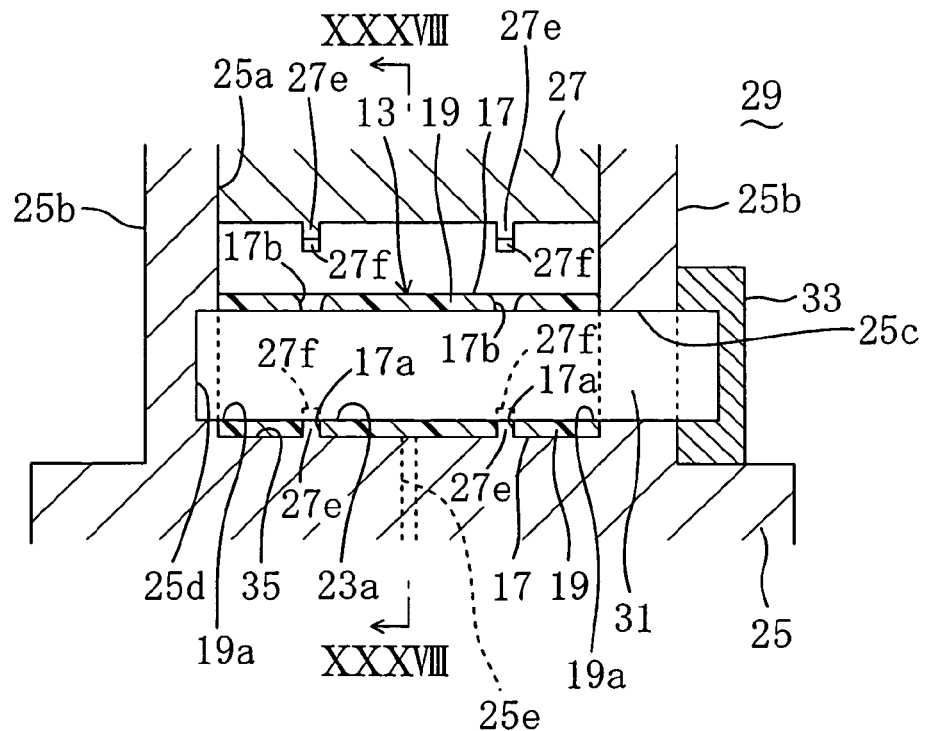
FIG. 38A is a cross-sectional view of the mold assembly in another step of the manufacturing method for the package tray according to Embodiment 9 in which a movable mold of the mold assembly is retracted and a package tray is molded in the mold cavity and FIG. 38B is a cross-sectional view taken along the line XXXVIII-XXXVIII in FIG. 38A.
Figure 38B:
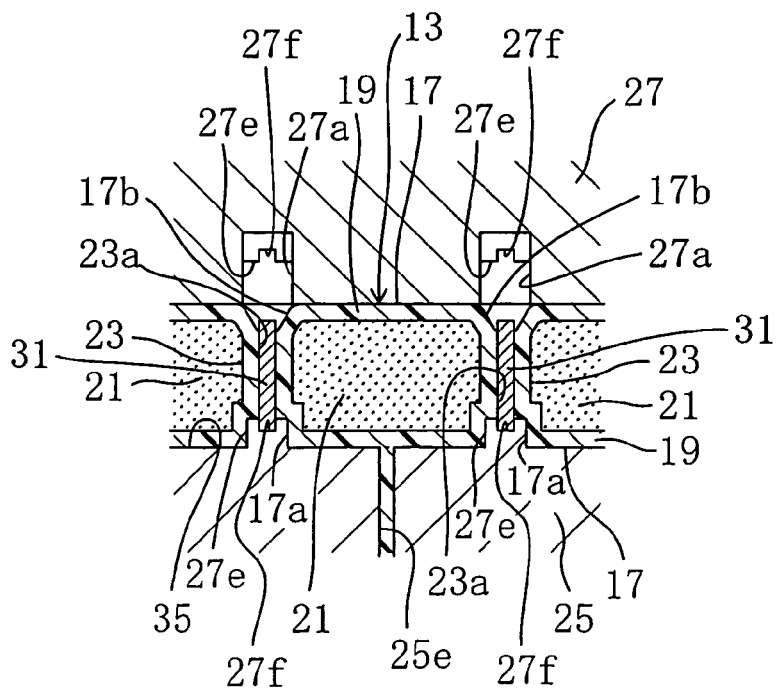

FIGS. 35 and 36 show a rectangular package tray 13 according to Embodiment 9 and FIGS. 37 and 38 show a mold assembly in different manufacturing steps for the package tray 13. In Embodiment 9, through holes 17a, . . . and 17b, . . . are formed in spots in the opposed surfaces 17 and 17 by the after-mentioned molding retention parts 27e, . . . for holding the core pins 31 during molding of the package tray 13 so that they are communicated with the hollows 23a of the hollow ribs 23 after expansion molding. In short, a pair of through holes 17a and 17b are oppositely formed through the opposed surfaces 17 and 17, respectively, for each hollow rib 23 so that they are communicated with the associated hollow 23a. Out of the through holes 17a, . . . and 17b, . . . , the through holes 17a, . . . in the surface 17 opposite the direction of expansion of the thermoplastic resin R (in the lower surface of the package tray 13 in FIG. 35) are each formed in a rectangular section conforming to the shape of the molding retention part 27e. On the other hand, the through holes 17b, . . . in the other surface 17 in front of the direction of expansion of the thermoplastic resin R (in the upper surface of the package tray 13 in FIG. 35) each have tapered side surfaces. The reason why the through holes 17a and 17b have such different shapes is that the former is engaged with the associated molding retention part 27e until the removal of the expansion-molded package tray 13 from the mold assembly 29 but the latter is released from the associated molding retention part 27e during expansion molding before the complete solidification of the skin layer 19 and thereby slightly loses its shape.

In the mold assembly 29, from each rectangular valley 27a of the movable mold 27 used in Embodiment 5 and the opposed portion of the stationary mold 25, boss-shaped molding retention parts 27e are raised into the cavity 35 at points spaced in the longitudinal direction of the core pin 31 (the right-to-left direction in FIG. 37A) so that the molding retention parts 27e from the rectangular valley 27a are opposed to those from the stationary mold 25, respectively. Each molding retention part 27e has a guide groove 27f formed at its distal end and is configured to move the core pin 31 back and forth with the core pin 31 held engaged in the guide grooves 27f of the upper and lower molding retention parts 27e. The molding retention parts 27e may be formed on either one of the stationary mold 25 and the movable mold 27. The number of molding retention parts 27b formed may be selected appropriately according to the length of the core pin 31. The manufacturing method for the package tray 13 is the same as in Embodiment 1 and, therefore, a description thereof is not given.

Thus, according to Embodiment 9, the same effects as in Embodiment 1 can be exhibited.

Further, according to Embodiment 9, like Embodiments 5 and 8, the package tray 13 can be enhanced in rigidity by the hollow ribs 23 bridging the distance between both the opposed surfaces 17.

Furthermore, according to Embodiment 9, the core pins 31 are set into the mold assembly 29 while being held by the molding retention parts 27e and their distal ends are then engaged into the engaging holes 25d of the stationary mold 25. Therefore, the core pins 31 can be prevented from trembling when set into the mold assembly 29 and their distal ends can be easily engaged into the engaging holes 25d. Further, the core pins 31 can be prevented from displacement or deformation due to the injection pressure of the thermoplastic resin R during the injection thereof into the cavity 35 and thereby allows the hollow ribs 23 to be easily formed in proper positions without displacement. As a result, the rigidity of the package tray 13 can be ensured properly.

Embodiment 10

Figure 39:
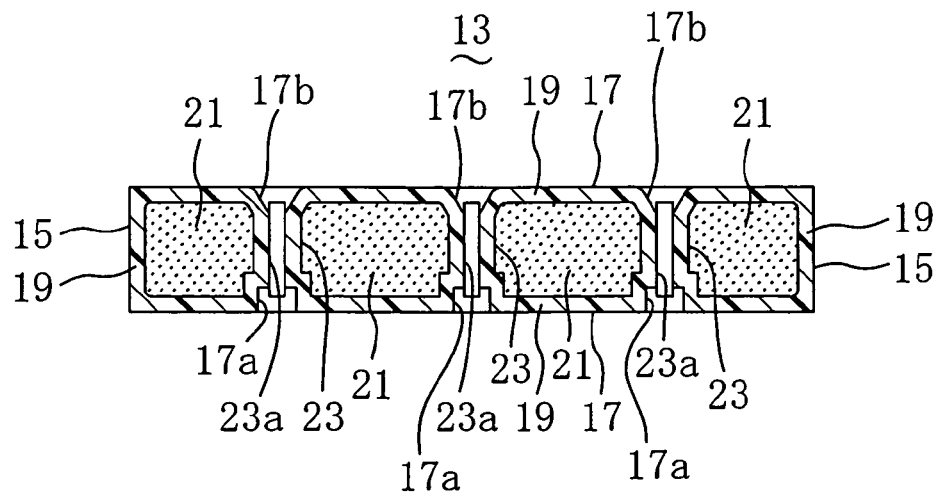
FIG. 39 is a cross-sectional view taken along the line XXXIX-XXXIX in FIG. 40.
Figure 40:
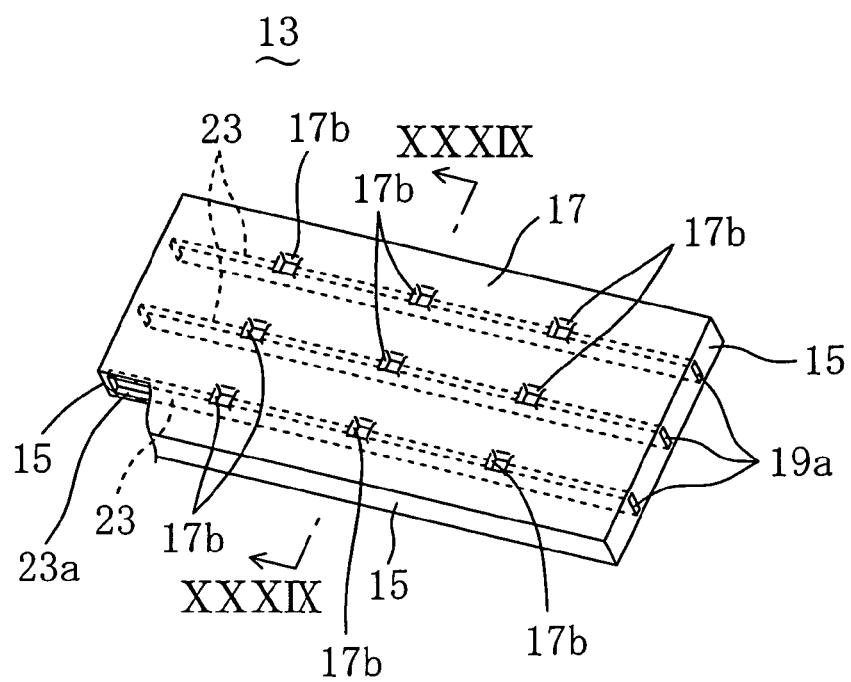
FIG. 40 is a perspective view of a package tray according to Embodiment 10 of the invention.
Figure 41A:
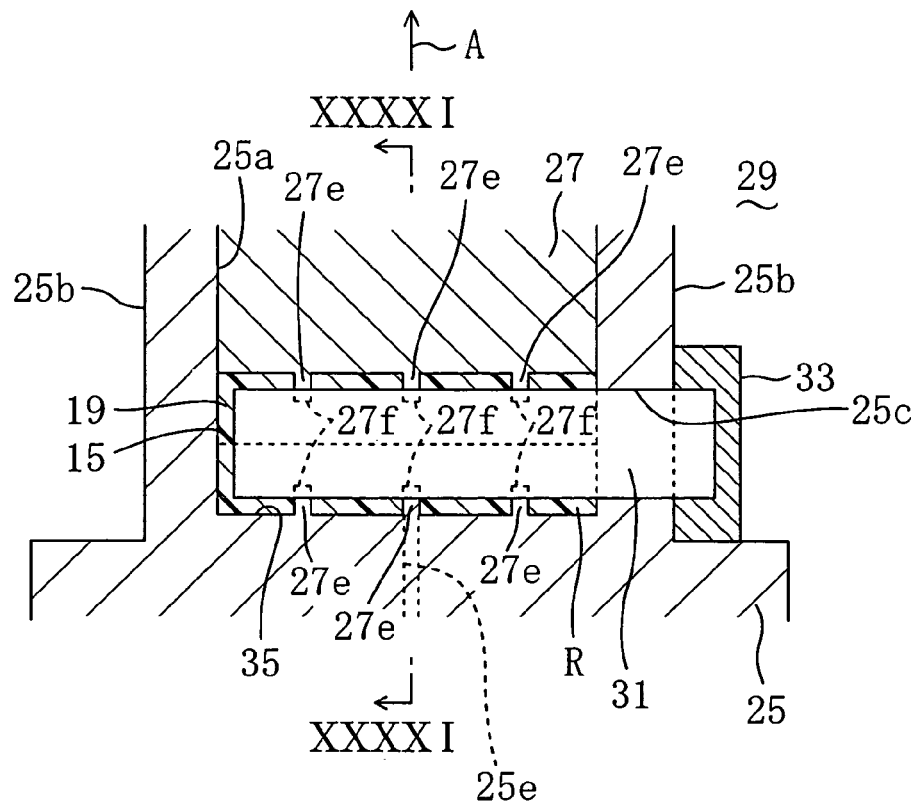
FIG. 41A is a cross-sectional view of a mold assembly in one step of a manufacturing method for the package tray according to Embodiment 10 in which a thermoplastic resin is injected in the cavity of the mold assembly to fill it and FIG. 41B is a cross-sectional view taken along the line XXXXI-XXXXI in FIG. 41A.
Figure 41B:
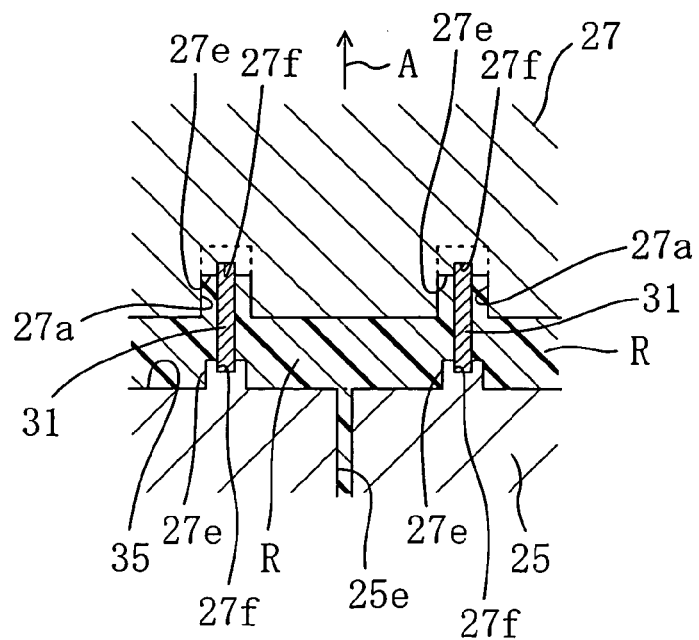
Figure 42A:
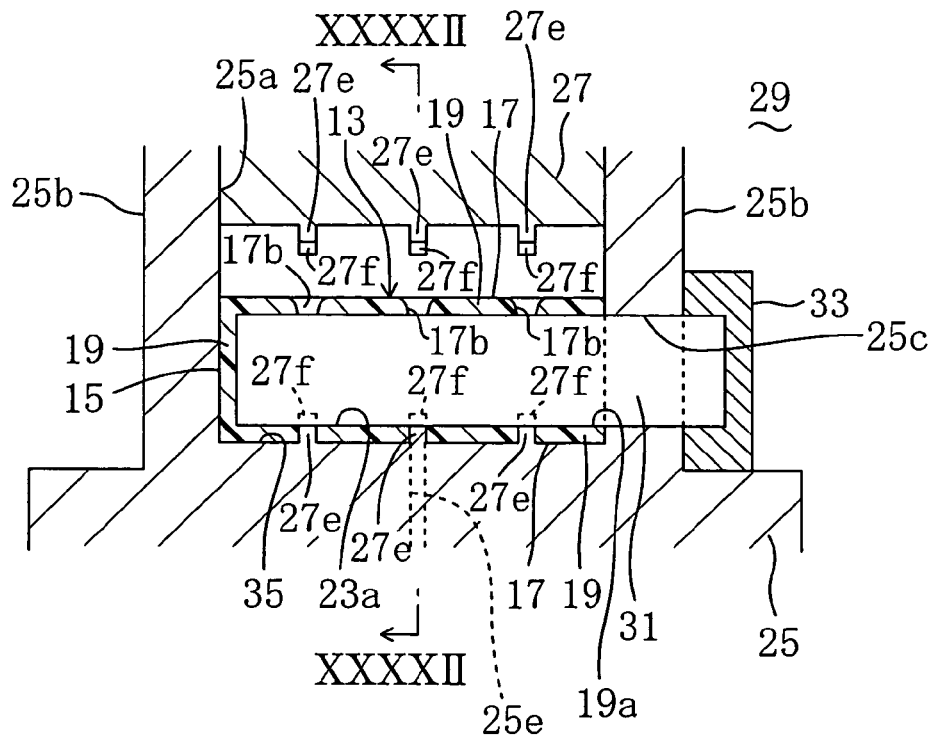
FIG. 42A is a cross-sectional view of the mold assembly in another step of the manufacturing method for the package tray according to Embodiment 10 in which a movable mold of the mold assembly is retracted and a package tray is molded in the mold cavity and FIG. 42B is a cross-sectional view taken along the line XXXXII-XXXXII in FIG. 42A.
Figure 42B:
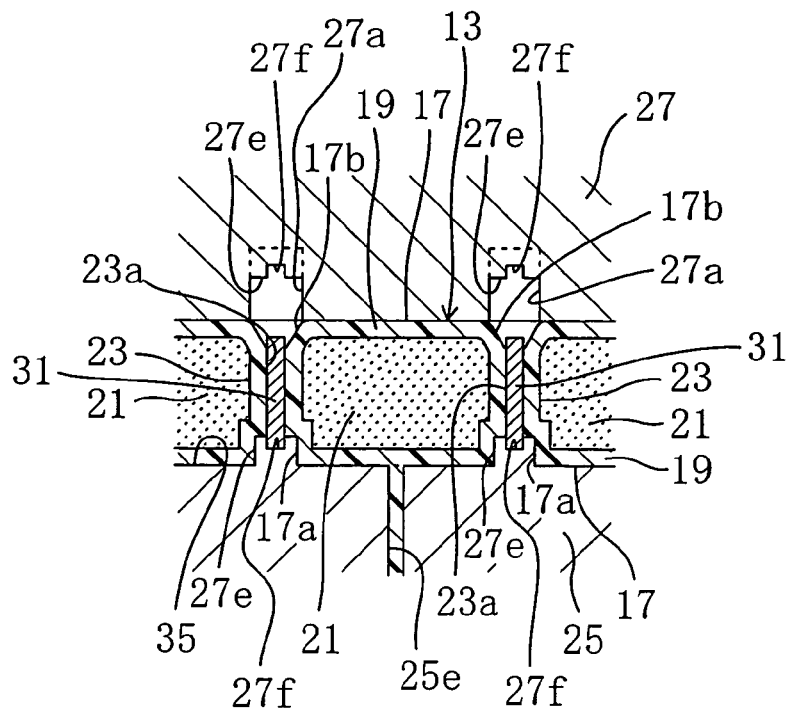

FIGS. 39 and 40 show a rectangular package tray 13 according to Embodiment 10 and FIGS. 41 and 42 show a mold assembly in different manufacturing steps for the package tray 13. Embodiment 10 is the same as Embodiment 9 in that through holes 17a, . . . and 17b, . . . are formed in spots in the opposed surfaces 17 and 17 by the molding retention parts 27e, . . . for holding the core pins 31 during molding of the package tray 13 so that they are communicated with the hollows 23a of the hollow ribs 23 after expansion molding, but different from Embodiment 9 in that the hollow 23a of each hollow rib 23 opens into only one of the opposed sides 15, i.e., the portion of the skin layer 19 at the side 15 closer to the root end of the core pin 31, and is closed at the other of the opposed sides 15. By necessity, the opening 19a communicating with the hollow 23a of the hollow rib 23 is formed only through the one of the opposed sides 15. Further, in Embodiment 10, the engaging hole 25d of Embodiment 9 engageable with the distal end of the core pin 31 is not formed in the side wall 25b of the stationary mold 25. Therefore, in Embodiment 10, the length of the core pin 31 is shorter than that in Embodiment 9 and a clearance corresponding to the thickness of the skin layer 19 is created between the distal end of the core pin 31 at the end of entry and the side wall 25b of the stationary mold 25. The manufacturing method for the package tray 13 is the same as in Embodiment 1 and, therefore, a description thereof is not given.

Thus, according to Embodiment 10, the same effects as in Embodiment 1 can be exhibited.

Further, according to Embodiment 10, like Embodiments 5, 8 and 9, the package tray 13 can be enhanced in rigidity by the hollow ribs 23 bridging the distance between both the opposed surfaces 17.

Furthermore, according to Embodiment 10, since the core pins 31 are held, though cantilevered, by the molding retention parts 27e during the injection of the thermoplastic resin R into the cavity 35, the core pins 31 can be prevented from displacement due to the injection pressure of the thermoplastic resin R and thereby allows the hollow ribs 23 to be easily formed in proper positions without displacement.

In each of Embodiments 1 to 9, like Embodiment 10, both ends of each hollow rib may be continued with the skin layer 19 at two opposed sides 15 and formed with an opening 19a only at one of the opposed sides 15 to communicate with the hollow 23a of the hollow rib 23.

The core pins 31 in Embodiments 1 and 2 may be of plate shape as in Embodiments 3 to 10 or of triangular section.

Though each of the above embodiments describes the case where the resin panel is applied to the package tray 13 for a hatchback car, the resin panel is applicable to car panels including trunk boards, floor panels and inner side panels or various panels other than car panels, such as panels for electrical appliances.

In each of the above embodiments, the expanded layer 21 is formed using spring-back of fibers. However, a foaming agent may be contained in fiber-contained thermoplastic resin. In this case, it is preferable if the movable mold 27 or the first and second movable molds 39 and 41 are retracted farther to increase the thickness of the resin in the direction of retraction of the movable mold. The reason is that even the lack of the restoring force (expansion pressure) of fibers due to spring-back can be compensated for by the foaming force (expansion pressure) of the foaming agent, thereby surely forming voids. Alternatively, depending upon applications or purposes, the expanded layer can be formed not using a thermoplastic resin containing fibers and a foaming agent but using a thermoplastic resin containing only a foaming agent. In these cases, foaming agents used include chemical foaming agents producing gas by chemical reaction and physical foaming agents using inactive gas such as carbon dioxide gas or nitrogen gas.

What is claimed is:

1. A resin panel for an automobile including:
a flat and rectangular plate removably loaded in a trunk in a rear part of a car body;
a skin layer formed of a solid layer on opposed sides thereof along a direction of the panel thickness and both opposed surfaces thereof orthogonal to the opposed sides; and
an expanded layer formed in an inner part thereof surrounded by the skin layer to have a multiplicity of voids during molding of the resin panel to expand a thermoplastic resin in the cavity, wherein a plurality of hollow ribs respectively having a hollow therein are formed of a solid layer in the expanded layer to extend over an entire length of long sides of the opposed sides of the resin panel, to seamlessly continue out to the skin layer adjacent at least one of the panel short sides of the opposed sides of the resin panel, the end parts of the short sides facing each other, and to be arranged parallel at intervals along the short sides of the resin panel, and
an opening in communication with the hollow of the hollow rib is formed through the skin layer adjacent at least one of the panel sides, and
wherein the plurality of hollow ribs are formed of a same resin as the opposed surfaces, the opposed sides, and the expanded layer, and the hollow ribs are seamlessly formed with the opposed surfaces, and the opposed sides.

2. The resin panel for an automobile of claim 1, wherein the hollow rib exists toward one of the surfaces of the panel.

3. The resin panel for an automobile of claim 1, wherein the hollow rib exists in the middle of the thickness of the resin panel.

4. The resin panel for an automobile of claim 1, wherein the hollow rib continues out to the skin layer at one of the surfaces of the panel.

5. The resin panel for an automobile of claim 4, wherein the hollow rib has a flat and rectangular shape and continues out to the skin layer at one of the surfaces of the panel.

6. The resin panel for an automobile of claim 5, wherein the hollow rib projects from the skin layer at one of the surfaces of the panel to form a ridge.

7. The resin panel for an automobile of claim 4 or 5, wherein at least one of both the panel surfaces has a through hole, the through hole communicating with the hollow of the hollow rib.

8. The resin panel for an automobile of claim 1, wherein some of the plurality of hollow ribs exist toward and continue out to one of the surfaces of the panel while the others exist toward and continue out to the opposed surface of the panel, and
the hollow ribs toward one of the opposed panel surfaces and the hollow ribs toward the other panel surface are alternated along the longitudinal direction of the resin panel.

9. A method for manufacturing the resin panel according to claim 1, comprising:
injecting a thermoplastic resin into the cavity to fill the cavity in a state that the mold assembly is closed and a core pin for forming the hollow rib is set in the cavity and enlarging the volume of the cavity in the course of solidification of the thermoplastic resin in the cavity to expand the thermoplastic resin; and
then retracting the core pin from within the cavity.

10. A method for manufacturing the resin panel according to claim 5, comprising:
injecting a thermoplastic resin into the cavity to fill the cavity in a state that the mold assembly is closed and a core pin slightly smaller in width than the width of the cavity when enlarged in volume is set in the cavity and enlarging the volume of the cavity in the course of solidification of the thermoplastic resin in the cavity to expand the thermoplastic resin; and
then retracting the core pin from within the cavity.

11. A method for manufacturing the resin panel according to claim 7, comprising:
injecting a thermoplastic resin into the cavity to fill the cavity in a state that the mold assembly is closed and a core pin for forming the hollow rib is set in the cavity and held by the molding retention part of the mold assembly projecting into the cavity and enlarging the volume of the cavity in the course of solidification of the thermoplastic resin in the cavity to expand the thermoplastic resin; and then retracting the core pin from within the cavity, thereby obtaining a resin panel in which at least one of both the panel surfaces has a through hole formed as a spot by the molding retention part to communicate with the hollow of the hollow rib.

12. A method for manufacturing the resin panel according to claim 8, comprising:

closing the mold assembly and setting in the cavity a plurality of core pins for forming the plurality of hollow ribs so that some of the plurality of core pins are disposed toward one side of the cavity toward which the thermoplastic resin expands while the others are disposed toward the other side of the cavity away from which the thermoplastic resin expands and the core pins towards the one side of the cavity and the core pins toward the other side of the cavity are alternated along the panel surfaces;

then injecting a thermoplastic resin into the cavity to fill the cavity and enlarging the volume of the cavity in the course of solidification of the thermoplastic resin in the cavity to expand the thermoplastic resin; and then retracting the core pins from within the cavity.

* * * * *